United States Patent
Horiguchi et al.

(10) Patent No.: US 12,478,562 B2
(45) Date of Patent: Nov. 25, 2025

(54) DENTAL RESTORATION MATERIAL COMPOSITION

(71) Applicant: KURARAY NORITAKE DENTAL INC., Kurashiki (JP)

(72) Inventors: Hirotaka Horiguchi, Niigata (JP); Tatsuya Kajikawa, Chiba (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 730 days.

(21) Appl. No.: 17/787,975

(22) PCT Filed: Dec. 24, 2020

(86) PCT No.: PCT/JP2020/048454
§ 371 (c)(1),
(2) Date: Jun. 22, 2022

(87) PCT Pub. No.: WO2021/132463
PCT Pub. Date: Jul. 1, 2021

(65) Prior Publication Data
US 2023/0040426 A1 Feb. 9, 2023

(30) Foreign Application Priority Data
Dec. 24, 2019 (JP) ................. 2019-233577

(51) Int. Cl.
| | |
|---|---|
| A61K 6/889 | (2020.01) |
| A61K 6/17 | (2020.01) |
| A61K 6/60 | (2020.01) |
| A61K 6/62 | (2020.01) |
| A61K 6/71 | (2020.01) |
| A61K 6/76 | (2020.01) |
| A61K 6/77 | (2020.01) |
| A61K 6/887 | (2020.01) |

(52) U.S. Cl.
CPC .............. *A61K 6/889* (2020.01); *A61K 6/17* (2020.01); *A61K 6/60* (2020.01); *A61K 6/62* (2020.01); *A61K 6/71* (2020.01); *A61K 6/76* (2020.01); *A61K 6/77* (2020.01); *A61K 6/887* (2020.01)

(58) Field of Classification Search
CPC . A61K 6/889; A61K 6/77; A61K 6/76; A61K 6/60; A61K 6/62; A61K 6/17; A61K 6/71; A61K 6/887
See application file for complete search history.

(56) References Cited

U.S. PATENT DOCUMENTS

| | | |
|---|---|---|
| 2017/0224591 A1 | 8/2017 | Vogel et al. |
| 2021/0038353 A1 | 2/2021 | Sakamaki |

FOREIGN PATENT DOCUMENTS

| | | |
|---|---|---|
| JP | 2007314484 A | 12/2007 |
| JP | 2016008211 A | 1/2016 |
| JP | 2017524020 A | 8/2017 |
| WO | WO-2018181832 A1 | 10/2018 |
| WO | WO-2019107534 A1 | 6/2019 |

OTHER PUBLICATIONS

Extended European Search Report issued Nov. 6, 2023 in European Patent Application No. 20904704.2, 7 pages.
Gotti et al., "Influence of nanogel additive hydrophilicity on dental adhesive mechanical performance and dentin bonding", Dental Materials, vol. 32, pp. 1406-1413, 2016.
International Search Report issued Mar. 2, 2021 in PCT/JP2020/048454 (with English translation), 6 pages.
Moreas et al., "Control of polymerization shrinkage and stress in nanogel-modified monomer and composite materials", Dental Materials, vol. 27, pp. 509-519, 2011.

*Primary Examiner* — Patrick D Niland
(74) *Attorney, Agent, or Firm* — Element IP, PLC

(57) ABSTRACT

A dental restoration material composition includes a (meth)acrylic acid ester compound (A) having two or more (meth)acryloyloxy groups per molecule, a mono(meth)acrylic acid ester compound (B), a polymerization initiator (C), and an organic-inorganic composite filler (D). The mono(meth)acrylic acid ester compound (B) includes at least one selected from the group consisting of a mono(meth)acrylic acid ester compound (B-1) represented by formula (I), and a mono(meth)acrylic acid ester compound (B-2) represented by formula (II). $R^1$ and $R^2$ are each independently a group represented by formula (i) or a group represented by formula (ii), and X is a divalent hydrocarbon group having 1 to 6 carbon atoms, or an oxygen atom.

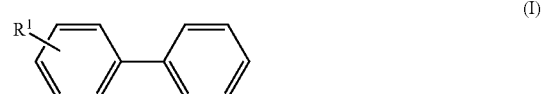

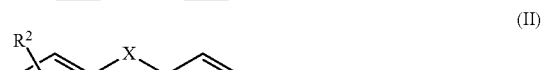

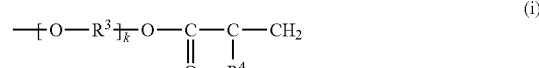

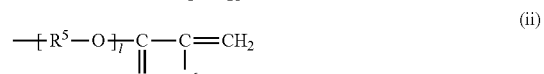

13 Claims, No Drawings

DENTAL RESTORATION MATERIAL COMPOSITION

TECHNICAL FIELD

The present invention relates to a dental restoration material composition that can be used for partial or whole replacement of natural tooth in the field of dentistry.

BACKGROUND ART

Dental restoration material compositions such as dental composite resins have come to be frequently used as materials for aesthetic and functional restoration of tooth defects and caries in dental treatment. As a rule, a dental composite resin is a paste-like composition containing a matrix resin composed of several types of polymerizable monomers, together with a filler, such as an inorganic filler or an organic-inorganic composite filler, and a polymerization initiator.

Some of the requirements of dental restoration material compositions are, for example, high mechanical strength and high polishability, the shade and translucency similar to natural teeth, and good ease of handling afforded to dentists in filling procedures.

For reasons related to depth of photocure and other factors, a dental composite resin can be placed up to an acceptable limit of typically about 2 mm when applied to a tooth cavity, and tooth cavities more than 2 mm deep are typically restored by repeating the filling and photocure procedures. A newer category of dental composite resins that has attracted interest in recent years from the perspective of reducing restoration treatment time is a bulk fill composite resin, which is cured at once over a 4 to 5 mm layer thickness. However, because an increased amount of composite resin is cured at once in the restoration of a deep tooth cavity with a bulk fill composite resin, an increased polymerization shrinkage stress is exerted at the bonding interface with the tooth cavity during photocure. Such a large polymerization shrinkage stress can lead to a contraction gap as a result of the dental composite resin pulling away from the tooth cavity during cure, and this increases the likelihood of clinical defects such as secondary caries, stimulation of tooth pulp, staining, and loosening of the cured product. For these reasons, it is still common clinical practice to use a traditional dental composite resin also for the restoration treatment of deep cavities by repeating layering and photoirradiation, instead of using a bulk fill composite resin.

A dental restoration material composition intended to reduce polymerization shrinkage stress is known. For example, Patent Literature 1 discloses a radically polymerizable dental material in which a polymerizable monomer mixture has a refractive index close to a refractive index of a filler before cure to increase the depth of cure, and in which a monofunctional polymerizable monomer is contained to inhibit densification of a crosslink network, and reduce polymerization shrinkage stress.

CITATION LIST

Patent Literature

Patent Literature 1: JP 2017-524020 T

SUMMARY OF INVENTION

Technical Problem

However, investigations by the present inventors revealed that the radically polymerizable dental material described in Patent Literature 1 cannot satisfy mechanical strength and polymerization shrinkage stress at the same time because, while the presence of at least a certain quantity of monofunctional polymerizable monomer was shown to reduce polymerization shrinkage stress, increasing the content of monofunctional polymerizable monomer to achieve a satisfactory level of polymerization shrinkage stress reduction greatly reduces the mechanical strength. Another finding is that a further reduction of mechanical strength results when an organic-inorganic composite filler is contained to provide polishability and ease of handling of a paste.

It is accordingly an object of the present invention to provide a dental restoration material composition that is low in polymerization shrinkage stress, and that excels in mechanical strength and polishability in the form of a cured product.

Solution to Problem

After intensive studies, the present inventors found that the foregoing object can be achieved with a composition comprising a (meth)acrylic acid ester compound having two or more (meth)acryloyloxy groups per molecule, a specific mono(meth)acrylic acid ester compound, a polymerization initiator, and an organic-inorganic composite filler. The present invention was completed after further studies.

Specifically, the present invention includes the following.

[1] A dental restoration material composition comprising a (meth)acrylic acid ester compound (A) having two or more (meth)acryloyloxy groups per molecule, a mono(meth)acrylic acid ester compound (B), a polymerization initiator (C), and an organic-inorganic composite filler (D), the mono(meth)acrylic acid ester compound (B) comprising at least one selected from the group consisting of a mono(meth)acrylic acid ester compound (B-1) represented by the following general formula (I), and a mono(meth)acrylic acid ester compound (B-2) represented by the following general formula (II),

[Chem. 1]

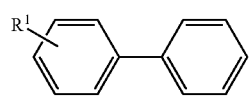

(I)

[Chem. 2]

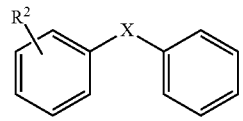

(II)

wherein $R^1$ and $R^2$ are each independently a group represented by the following general formula (i) or a group represented by the following general formula (ii), and X is a divalent hydrocarbon group having 1 to 6 carbon atoms, or an oxygen atom,

[Chem. 3]

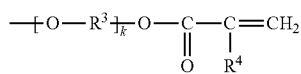

(i)

[Chem. 4]

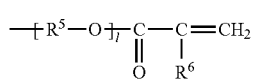

(ii)

wherein $R^3$ and $R^5$ are each independently a divalent hydrocarbon group having 1 to 10 carbon atoms, $R^4$ and $R^6$ are each independently a hydrogen atom or a methyl group, and k and l are each independently an integer of 0 to 6.

[2] The dental restoration material composition according to [1], wherein the organic-inorganic composite filler (D) is present in an amount of 30 to 75 mass % of a total amount of the dental restoration material composition.

[3] The dental restoration material composition according to [1] or [2], wherein the organic-inorganic composite filler (D) is an organic-inorganic composite filler that has an average particle diameter of 3 μm to 25 μm, and in which an inorganic filler having an average primary particle diameter of 0.5 μm or less is dispersed in an organic matrix.

[4] The dental restoration material composition according to [3], wherein the organic matrix comprises a polymer of a polymerizable monomer (d2), and the polymerizable monomer (d2) comprises the (meth)acrylic acid ester compound (A) having two or more (meth)acryloyloxy groups per molecule.

[5] The dental restoration material composition according to any one of [1] to [4], wherein the organic-inorganic composite filler (D) comprises an organic-inorganic composite filler (D-1) having a refractive index (nD) of 1.50<nD≤1.70, and an organic-inorganic composite filler (D-2) having a refractive index of 1.45≤nD≤1.50.

[6] The dental restoration material composition according to any one of [1] to [5], wherein the mono(meth)acrylic acid ester compound (B) comprises a mono(meth)acrylic acid ester compound (B-2) represented by general formula (II).

[7] The dental restoration material composition according to [6], wherein X is an oxygen atom.

[8] The dental restoration material composition according to any one of [1] to [7], wherein k and l are 0 or 1.

[9] The dental restoration material composition according to any one of [1] to [8], which further comprises an inorganic filler (E).

[10] The dental restoration material composition according to any one of [1] to [9], which further comprises a polymer (F).

[11] The dental restoration material composition according to [10], wherein the polymer (F) is a prepolymer (F-1) having an unreacted polymerizable functional group.

[12] The dental restoration material composition according to [11], wherein the prepolymer (F-1) has a weight-average molecular weight of 1,000 to 1,000,000.

[13] The dental restoration material composition according to any one of [1] to [12], wherein a whole polymerizable monomer mixture has a viscosity at 23° C. of 2,000 cP or less.

[14] The dental restoration material composition according to any one of [1] to [13], wherein the (meth)acrylic acid ester compound (A) having two or more (meth)acryloyloxy groups per molecule comprises a compound (A-1) having an aromatic ring.

[15] The dental restoration material composition according to any one of [1] to [14], wherein the (meth)acrylic acid ester compound (A) having two or more (meth)acryloyloxy groups per molecule is a compound having no hydroxyl group.

Advantageous Effects of Invention

A dental restoration material composition of the present invention is low in polymerization shrinkage stress, and excels in mechanical strength and polishability in the form of a cured product.

DESCRIPTION OF EMBODIMENTS

A dental restoration material composition of the present invention comprises a (meth)acrylic acid ester compound (A) having two or more (meth)acryloyloxy groups per molecule, a mono(meth)acrylic acid ester compound (B), a polymerization initiator (C), and an organic-inorganic composite filler (D). Importantly, the mono(meth)acrylic acid ester compound (B) comprises at least one selected from the group consisting of a mono(meth)acrylic acid ester compound (B-1) represented by the general formula (I) above, and a mono(meth)acrylic acid ester compound (B-2) represented by the general formula (II) above.

Though the reason why the foregoing configuration produces the effects of the present invention is somewhat unclear, the present inventors have proposed the following explanation. When contained as a filler, particles having a small average primary particle diameter are known to provide the polishability required as a dental material. However, this was found to involve a problem because a smaller average primary particle diameter means that the filler has a larger specific surface area, and increases the polymerization shrinkage stress. It is known to contain an organic-inorganic composite filler as a technique of improving polishability and reducing polymerization shrinkage stress at the same time. However, with this technique, the mechanical strength of the cured product obtained tends to decrease. That is, a composition containing an organic-inorganic composite filler needs further improvements in terms of mechanical strength, even though such a composition tends to be able to reduce polymerization shrinkage stress while providing good polishability. In the present invention, the presence of a specific monofunctional mono(meth)acrylic acid ester compound (B) having a plurality of aromatic rings appears to enable a further reduction of polymerization shrinkage stress with relatively large meshes being present in the polymer network because of the monofunctional nature of this compound, and, presumably, the π-π interactions between the aromatic rings strengthen the interaction between polymer chains after polymerization, producing a dental restoration material composition that also excels in mechanical strength in the form of a cured product.

The present invention is described below in detail. In the present specification, the upper limits and lower limits of numeric ranges (for example, ranges of contents of components, ranges of values calculated from components, and numeric ranges of physical properties) can be combined appropriately. In the present specification, the numeric values represented by symbols in various formulae also can be combined as appropriate.

(Meth)Acrylic Acid Ester Compound (A) Having Two or More (Meth)Acryloyloxy Groups Per Molecule In a dental restoration material composition of the present invention, the (meth)acrylic acid ester compound (A) having two or more (meth)acryloyloxy groups per molecule is used to impart improved water resistance and mechanical strength to a cured product of the dental restoration material composition. In the present invention, the (meth)acrylic acid ester compound (A) having two or more (meth)acryloyloxy groups per molecule (hereinafter, also referred to as "(meth)acrylic acid ester compound (A)") is not particularly limited, as long as it is a known (meth)acrylic acid ester compound used in dental composite resins and other such applications, and the present invention can exhibit its effects. However, in order to improve the post-cure mechanical strength, the (meth)acrylic acid ester compound (A) preferably contains a cyclic structure, a structure with a rigid skeleton. Examples of compounds having a cyclic structure include a compound (A-1) having an aromatic ring, a compound (A-2) having an alicyclic ring, and a compound (A-3) having a heterocyclic ring. The (meth)acrylic acid ester compound (A) may include a compound (A-4) having no cyclic structure. The (meth)acrylic acid ester compound (A) may be a polyfunctional polymerizable compound having one or more polymerizable functional groups other than two or more (meth)acryloyloxy groups, or a bifunctional polymerizable compound having only two (meth)acryloyloxy groups per molecule, provided that the (meth)acrylic acid ester compound (A) has two or more (meth)acryloyloxy groups per molecule. In the present invention, (meth)acryloyloxy groups and other polymerizable functional groups are collectively referred to as "polymerizable functional groups". Examples of the polymerizable functional groups of the (meth)acrylic acid ester compound (A) include those exemplified for prepolymer (F-1) (described later), and the polymerizable functional groups are preferably (meth)acryloyl groups, more preferably (meth)acryloyloxy groups. A certain preferred embodiment is, for example, a curable composition for dental restoration in which the polymerizable functional groups of the (meth)acrylic acid ester compound (A) are solely (meth)acryloyloxy groups. Another preferred embodiment is, for example, a dental restoration material composition in which the (meth)acrylic acid ester compound (A) has a compound (A-1) having an aromatic ring, or a compound (A-2) having an alicyclic ring, and in which the polymerizable functional groups of the compound (A-1) having an aromatic ring, or the polymerizable functional groups of the compound (A-2) having an alicyclic ring are solely (meth)acryloyloxy groups.

The (meth)acrylic acid ester compound (A) may be used alone, or two or more thereof may be used in combination.

In view of the ability to further improve the post-cure mechanical strength through π-π interactions with mono (meth)acrylic acid ester compound (B) (described later), the (meth)acrylic acid ester compound (A) more preferably includes a compound (A-1) having an aromatic ring, and even more preferably includes a compound having a bisphenol A skeleton. In the present invention, the notation "(meth)acryl" is meant to be inclusive of both methacryl and acryl. The same applies to similar notation, such as "(meth) acrylate".

Examples of the (meth)acrylic acid ester compound (A) in the present invention are as follows.

Examples of the aromatic ring in the compound (A-1) having an aromatic ring include benzene, naphthalene, anthracene, biphenyl, benzophenone, phenyl ether, and bisphenol A. Bisphenol A is preferred in view of the cured product exhibiting even superior mechanical strength and water resistance with the mono(meth)acrylic acid ester compound (B). Examples of the compound (A-1) having an aromatic ring include 2,2-bis[4-[3-acryloyloxy-2-hydroxypropoxy]phenyl]propane, 2,2-bis[4-(3-methacryloyloxy-2-hydroxypropoxy)phenyl]propane (commonly known as "Bis-GMA"), 2,2-bis[4-[2-(acryloyloxy)ethoxy]phenyl]propane, 2,2-bis[4-[2-(methacryloyloxy)ethoxy]phenyl]propane (commonly known as "Bis-MEPP"), 2,2-bis[4-(meth)acryloyloxypolyethoxyphenyl]propane (for example, the average number of moles of ethoxy group added is 2.6), 1,2-bis[3-(meth)acryloyloxy-2-hydroxypropoxyphenyl]ethane, and 9,9-bis[4-(2-acryloyloxyethoxy)phenyl]fluorene. In view of mechanical strength after cure, preferred are 2,2-bis[4-[3-acryloyloxy-2-hydroxypropoxy]phenyl]propane, 2,2-bis[4-(3-methacryloyloxy-2-hydroxypropoxy)phenyl]propane, 2,2-bis[4-(meth)acryloyloxyethoxyphenyl]propane, and 2,2-bis[4-methacryloyloxypolyethoxyphenyl]propane (the average number of moles of ethoxy group added is 2.6; commonly known as "D2.6E"), which all have a bisphenol A skeleton.

Examples of the alicyclic ring of the compound (A-2) having an alicyclic ring include cyclopentane, cyclohexane, cycloheptane, dicyclodecane, tricyclodecane, adamantane, and isobornyl. Examples of the compound (A-2) having an alicyclic ring include 1,4-cyclohexane dimethanol di(meth)acrylate, tricyclodecane dimethanol di(meth)acrylate, adamantyl di(meth)acrylate, and adamantyl tri(meth)acrylate.

Examples of the heterocyclic ring of the compound (A-3) having a heterocyclic ring include:

heterocyclic rings having only a nitrogen atom as a heteroatom, such as triazine, carbazole, pyrrole, pyrazole, pyrrolidine, piperidine, piperazine, pyrazine, pyrimidine, pyridine, pyridazine, and tetrazole;

heterocyclic rings having only an oxygen atom as a heteroatom, such as furan, tetrahydrofuran, pyran, oxane, dioxane, and dioxolan;

heterocyclic rings having an oxygen atom and a nitrogen atom as heteroatoms, such as oxazole, isoxazole, oxazine, and morpholine;

heterocyclic rings having only a sulfur atom as a heteroatom, such as thiophene, tetrahydrothiophene, and tetrahydrothiopyran; and heterocyclic rings containing a sulfur atom and a nitrogen atom as heteroatoms, such as thiazine and thiazole.

The compound (A-3) having a heterocyclic ring is not particularly limited, as long as it is a compound having a heterocyclic ring and a polymerizable functional group. Examples of such compounds include ethoxylated isocyanuric tri(meth)acrylate, ε-caprolactone-modified tris(2-(meth)acryloyloxyethyl)isocyanurate, and hydroxypivalaldehyde-modified trimethylolpropane di(meth)acrylate. A certain preferred embodiment is, for example, a dental restoration material composition that is essentially free of a compound (A-3) having a heterocyclic ring. Another preferred embodiment is, for example, a dental restoration material composition that is essentially free of a compound having a nitrogen atom-containing heterocyclic ring and a polymerizable functional group. The nitrogen atom-containing heterocyclic ring includes a heterocyclic ring containing only a nitrogen atom as a heteroatom, a heterocyclic ring containing an oxygen atom and a nitrogen atom as heteroatoms, and a heterocyclic ring containing a sulfur atom and a nitrogen atom as heteroatoms. The phrase "essentially free of a compound having a nitrogen atom-containing heterocyclic ring and a polymerizable functional group" means that the content of a compound having a nitrogen atom-containing heterocyclic ring and a polymerizable functional group is less than 0.1 mass %, preferably less than 0.05 mass %, more preferably less than 0.01 mass %, even more preferably 0 mass % in the dental restoration material composition. Similarly, the phrase "essentially free of a compound (A-3) having a heterocyclic ring and a polymerizable functional group" means that a compound (A-3) having a heterocyclic ring and a polymerizable functional group is present in these amounts.

Examples of the compound (A-4) having no cyclic structure include:

bifunctional monomers of aliphatic compounds, such as glycerol di(meth)acrylate, ethylene glycol di(meth)acrylate, diethylene glycol di(meth)acrylate, triethylene glycol di(meth)acrylate, propylene glycol di(meth)acrylate, butylene glycol di(meth)acrylate, neopentyl glycol di(meth)acrylate, 1,3-butanediol di(meth)acrylate, 1,5-pentanediol di(meth)acrylate, 1,6-hexanediol di(meth)acrylate, 1,10-decanediol di(meth)acrylate, 1,2-bis(3-methacryloyloxy-2-hydroxypropoxy)ethane, 2,2,4-trimethylhexamethylenebis(2-carbamoyloxyethyl)di(meth)acrylate, N-methacryloyloxyethylacrylamide, and N-methacryloyloxypropylamide; and tri- and higher-functional monomers such as trimethylolpropane tri(meth)acrylate, trimethylolethane tri(meth)acrylate, trimethylolmethane tri(meth)acrylate, pentaerythritol tri(meth)acrylate, pentaerythritol tetra(meth)acrylate, dipentaerythritol penta(meth)acrylate, N,N-(2,2,4-trimethylhexamethylene)bis[2-(aminocarboxy)propane-1,3-diol]tetra(meth)acrylate, and 1,7-diacryloyloxy-2,2,6,6-tetra(meth)acryloyloxymethyl-4-oxaheptane. Preferred are triethylene glycol diacrylate, triethylene glycol dimethacrylate (commonly known as "3G"), neopentyl glycol di(meth)acrylate, 1,2-bis(3-methacryloyloxy-2-hydroxypropoxy)ethane, 2,2,4-trimethylhexamethylenebis(2-carbamoyloxyethyl)dimethacrylate (commonly known as "UDMA"), 1,10-decanediol dimethacrylate (commonly known as "DD"), 2,2,4-trimethylhexamethylenebis(2-carbamoyloxyethyl)dimethacrylate, and N-methacryloyloxyethylacrylamide (commonly known as "MAEA").

In view of reducing the stickiness of the paste and providing good ease of handling for the paste, the (meth) acrylic acid ester compound (A) preferably includes a compound having no hydroxyl group. For example, the compound (A-1) having an aromatic ring, the compound (A-2) having an alicyclic ring, the compound (A-3) having a heterocyclic ring, or the compound (A-4) having no cyclic structure is preferably a compound having no hydroxyl group.

In certain embodiments, in view of ease of handling of the paste and the mechanical strength after cure, the (meth) acrylic acid ester compound (A) has a weight-average molecular weight (Mw) of preferably 500 to 50,000, more preferably 750 to 30,000, even more preferably 1,000 to 15,000. The weight-average molecular weight (Mw) can be measured using the same method used for the measurement of the weight-average molecular weight of prepolymer (F-1) (described later).

The content of the (meth)acrylic acid ester compound (A) in a dental restoration material composition of the present invention is preferably 10 to 99 mass % relative to the total amount of the (meth)acrylic acid ester compound (A) and the mono(meth)acrylic acid ester compound (B). In view of providing even superior mechanical strength, water resistance, and ease of handling for the paste, the content of the (meth)acrylic acid ester compound (A) is more preferably 30 to 95 mass %, even more preferably 50 to 90 mass %.

Mono(Meth)Acrylic Acid Ester Compound (B)

In a dental restoration material composition of the present invention, the mono(meth)acrylic acid ester compound (B) is used to improve the mechanical strength and water resistance of the cured product while reducing polymerization shrinkage stress during cure. The mono(meth)acrylic acid ester compound (B) can also reduce the viscosity of the dental restoration material composition, and impart good ease of handling to the paste. The mono(meth)acrylic acid ester compound (B) may be contained alone, or two or more thereof may be used in combination. The mono(meth)acrylic acid ester compound (B) comprises at least one selected from the group consisting of a mono(meth)acrylic acid ester compound (B-1) represented by the general formula (I) above (hereinafter, also referred to as "mono(meth)acrylic acid ester compound (B-1)"), and a mono(meth)acrylic acid ester compound (B-2) represented by the general formula (II) above (hereinafter, also referred to as "mono(meth) acrylic acid ester compound (B-2)"). The following describes the mono(meth)acrylic acid ester compound (B-1) and mono(meth)acrylic acid ester compound (B-2). In the mono(meth)acrylic acid ester compound (B), the skeleton represented by the general formula (I), and the skeleton represented by the general formula (II) are rigid and hydrophobic, and, accordingly, a cured product of the dental restoration material composition has low water absorbency, and a decrease of mechanical strength can be reduced.

The symbols in formula (I) are as follows. In formula (I), $R^1$ is a group represented by the general formula (i) above, or a group represented by the general formula (ii) above. In view of providing good curability for the dental restoration material composition obtained, $R^4$ and $R^6$ in formula (i) or (ii) are each independently a hydrogen atom or a methyl group. $R^3$ and $R^5$ are each independently a divalent hydrocarbon group having 1 to 10 carbon atoms. In view of good ease of handling of a paste of the dental restoration material composition and excellence of the mechanical strength after cure, the hydrocarbon group has preferably 1 to 6 carbon atoms, more preferably 1 to 4 carbon atoms, even more preferably 1 to 3 carbon atoms. Examples of the divalent hydrocarbon groups represented by $R^3$ and $R^5$ include a linear or branched alkylene group having 1 to 10 carbon atoms; a cycloalkylene group having 3 to 10 carbon atoms; and a phenylene group. Examples of the alkylene group include a methylene group, an ethylene group, an n-propylene group, an isopropylene group, an n-butylene group, an isobutylene group, a sec-butylene group, a tert-butylene group, an n-pentylene group, an isopentylene group, a hexamethylene group, a heptamethylene group, an octamethylene group, and a decamethylene group. Examples of the cycloalkylene group include a cyclopropylene group, a cyclobutylene group, a cyclopentylene group, a cyclohexylene group, and a cycloheptylene group. k and l are each independently an integer of 0 to 6. In view of providing excellent curability by reducing the viscosity of the dental restoration material composition and inhibiting bubble formation in the cured product, k is preferably 0 to 4, more preferably 0 to 3, even more preferably 0 to 2, particularly preferably 0 or 1. Preferably, l is 0 to 4, more preferably 0 to 2, even more preferably 0 or 1.

Examples of the mono(meth)acrylic acid ester compound (B-1) include o-phenylphenol (meth)acrylate, m-phenylphenol (meth)acrylate, p-phenylphenol (meth)acrylate, methoxylated-o-phenylphenol (meth)acrylate, methoxylated-m-phenylphenol (meth)acrylate, methoxylated-p-phenylphenol (meth)acrylate, ethoxylated-o-phenylphenol (meth)acrylate, ethoxylated-m-phenylphenol (meth)acrylate, ethoxylated-p-phenylphenol (meth)acrylate, propoxylated-o-phenylphenol (meth)acrylate, propoxylated-m-phenylphenol (meth)acrylate, propoxylated-p-phenylphenol (meth)acrylate, butoxylated-o-phenylphenol (meth)acrylate, butoxylated-m-phenylphenol (meth)acrylate, and butoxylated-p-phenylphenol (meth)acrylate. These may be used alone, or two or more thereof may be used in combination. In view of good ease of handling of a paste of the dental restoration material composition and excellence of the mechanical strength after cure, preferred are ethoxylated-o-phenylphenol acrylate, ethoxylated-m-phenylphenol acrylate, ethoxylated-p-phenylphenol acrylate, propoxylated-o-phenylphenol acrylate, propoxylated-m-phenylphenol acrylate, and propoxylated-p-phenylphenol acrylate. Even more preferred are ethoxylated-o-phenylphenol acrylate, ethoxylated-m-phenylphenol acrylate, and ethoxylated-p-phenylphenol acrylate. Particularly preferred are ethoxylated-o-phenylphenol acrylate, and ethoxylated-m-phenylphenol acrylate. Most preferred is ethoxylated-o-phenylphenol acrylate.

The symbols in formula (II) are as follows. In formula (II), X is a divalent hydrocarbon group having 1 to 6 carbon atoms, or an oxygen atom. Preferably, X is an oxygen atom in view of good ease of handling of a paste of the dental restoration material composition and excellence of the mechanical strength after cure. $R^2$ is a group represented by the general formula (i) above, or a group represented by the general formula (ii) above. In view of good ease of handling of a paste of the dental restoration material composition and excellence of the mechanical strength after cure, $R^4$ and $R^6$ in formula (i) or (ii) are each independently a hydrogen atom or a methyl group. $R^3$ and $R^5$ are each independently a divalent hydrocarbon group having 1 to 10 carbon atoms. In view of good ease of handling of a paste of the dental restoration material composition and excellence of the mechanical strength after cure, the hydrocarbon group has preferably 1 to 6 carbon atoms, more preferably 1 to 4 carbon atoms, even more preferably 1 to 3 carbon atoms. Examples of the hydrocarbon group include a linear or branched alkylene group having 1 to 10 carbon atoms; a cycloalkylene group having 3 to 10 carbon atoms; and a phenylene group. The alkylene group and cycloalkylene group of $R^3$ and $R^5$ are the same as in $R^3$ and $R^5$ of formula (I). The divalent hydrocarbon group represented by X has preferably 1 to 4 carbon atoms, more preferably 1 to 3 carbon atoms, even more preferably 1 to 2 carbon atoms. Examples of the divalent hydrocarbon group represented by X include a linear or branched alkylene group having 1 to 6 carbon atoms; and a cycloalkylene group having 3 to 6 carbon atoms. The alkylene group and cycloalkylene group of X are the same as the alkylene group and cycloalkylene group of the same numbers of carbon atoms represented by $R^3$ and $R^5$. k and l are each independently an integer of 0 to 6. In view of good ease of handling of a paste of the dental restoration material composition and excellence of the mechanical strength after cure, k is preferably 0 to 4, more preferably 0 to 3, even more preferably 0 to 2, particularly preferably 0 or 1. Preferably, l is 0 to 4, more preferably 0 to 2, even more preferably 0 or 1. A certain preferred embodiment is, for example, a dental restoration material composition in which the mono(meth)acrylic acid ester compound (B) comprises a mono(meth)acrylic acid ester compound (B-2) represented by general formula (II). Another certain preferred embodiment is, for example, a dental restoration material composition in which the mono(meth)acrylic acid ester compound (B) comprises a mono(meth)acrylic acid ester compound (B-2) represented by general formula (II), and in which X is an oxygen atom, and $R^2$ is a group represented by general formula (i). Yet another certain preferred embodiment is, for example, a dental restoration material composition in which the mono(meth)acrylic acid ester compound (B) comprises a mono(meth)acrylic acid ester compound (B-2) represented by general formula (II), and in which X is an oxygen atom, $R^2$ is a group represented by general formula (i), and k is 0 or 1.

Examples of the mono(meth)acrylic acid ester compound (B-2) include o-phenoxybenzyl (meth)acrylate, m-phenoxybenzyl (meth)acrylate, p-phenoxybenzyl (meth)acrylate, 2-(o-phenoxyphenyl)ethyl (meth)acrylate, 2-(m-phenoxyphenyl)ethyl (meth)acrylate, 2-(p-phenoxyphenyl)ethyl (meth)acrylate, 3-(o-phenoxyphenyl)propyl (meth)acrylate, 3-(m-phenoxyphenyl)propyl (meth)acrylate, 3-(p-phenoxyphenyl)propyl (meth)acrylate, 4-(o-phenoxyphenyl)butyl (meth)acrylate, 4-(m-phenoxyphenyl)butyl (meth)acrylate, 4-(p-phenoxyphenyl)butyl (meth)acrylate, 5-(o-phenoxyphenyl)pentyl (meth)acrylate, 5-(m-phenoxyphenyl)pentyl (meth)acrylate, 5-(p-phenoxyphenyl)pentyl (meth)acrylate, 6-(o-phenoxyphenyl)hexyl (meth)acrylate, 6-(m-phenoxyphenyl)hexyl (meth)acrylate, and 6-(p-phenoxyphenyl)hexyl (meth)acrylate. These may be used alone, or two or more thereof may be used in combination. In view of good ease of handling of a paste of the dental restoration material composition and excellence of the mechanical strength after cure, more preferred are o-phenoxybenzyl acrylate, m-phenoxybenzyl acrylate, p-phenoxybenzyl acrylate, 2-(o-phenoxyphenyl)ethyl acrylate, 2-(m-phenoxyphenyl)ethyl acrylate, and 2-(p-phenoxyphenyl)ethyl acrylate. Even more preferred are o-phenoxybenzyl acrylate, m-phenoxybenzyl acrylate, and p-phenoxybenzyl acrylate. Particularly preferred are o-phenoxybenzyl acrylate and m-phenoxybenzyl acrylate. Most preferred is m-phenoxybenzyl acrylate.

The content of the mono(meth)acrylic acid ester compound (B) in a dental restoration material composition of the present invention is preferably 1.0 to 90 mass % relative to the total amount of the (meth)acrylic acid ester compound (A) and the mono(meth)acrylic acid ester compound (B). In view of even superior mechanical strength, water resistance, and ease of handling of the paste, the content of the mono(meth)acrylic acid ester compound (B) is more preferably 5 to 80 mass %, even more preferably 10 to 70 mass %.

The polymerizable monomers contained in a dental restoration material composition of the present invention may consist essentially of (meth)acrylic acid ester compound (A) and mono(meth)acrylic acid ester compound (B). Here, polymerizable monomers consisting essentially of (meth)acrylic acid ester compound (A) and mono(meth)acrylic acid ester compound (B) means that the content of polymerizable monomers other than the (meth)acrylic acid ester compound (A) and the mono(meth)acrylic acid ester compound (B) is less than 10.0 mass %, preferably less than 5.0 mass %, more preferably less than 1.0 mass %, even more preferably less than 0.1 mass %, particularly preferably less than 0.01 mass % relative to the total amount of the polymerizable monomers contained in the dental restoration material composition.

A mixture of all the polymerizable monomers contained in a dental restoration material composition of the present invention has a viscosity at 23° C. of preferably 2,000 cP or less, more preferably 1,500 cP or less. When the viscosity is too high, it may not be possible to smoothly extrude the composition from a container, or the composition may suffer from poor ease of handling with an instrument as a result of increased stickiness of the paste. The viscosity of a mixture of all the polymerizable monomers may be, for example, 5 cP or more, though the lower limit is not particularly limited. The method of viscosity measurement is as described in the EXAMPLES section below.

Polymerization Initiator (C)

A dental restoration material composition of the present invention comprises a polymerization initiator (C). The polymerization initiator (C) may be selected from common polymerization initiators, particularly those used in dentistry. Particularly, photopolymerization initiators and/or chemical polymerization initiators may be used. The polymerization initiator (C) may be used alone, or two or more thereof may be used in combination.

Examples of the photopolymerization initiators include (bis)acylphosphine oxides and salts thereof, thioxanthones or quaternary ammonium salts of thioxanthones, ketals, α-diketones, benzoin alkyl ethers, and α-aminoketones.

The (bis)acylphosphine oxides and salts thereof include acylphosphine oxides and salts thereof, and bisacylphosphine oxides and salts thereof. Examples of the acylphosphine oxides and salts thereof include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di(2,6-dimethylphenyl) phosphonate, and salts of these (including sodium salts and lithium salts (for example, sodium salts of 2,4,6-trimethylbenzoylphenylphosphine oxide, potassium salts of 2,4,6-trimethylbenzoyldiphenylphosphine oxide, and ammonium salts of 2,4,6-trimethylbenzoyldiphenylphosphine oxide)). Examples of the bisacylphosphine oxides and salts thereof include bis(2,6-dichlorobenzoyl)phenylphosphine oxide, bis (2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2, 6-dimethoxybenzoyl)phenylphosphine oxide, bis(2,6-dimethoxybenzoyl)-2,4,4-trimethylpentylphosphine oxide, bis(2, 6-dimethoxybenzoyl)-2,5-dimethylphenylphosphine oxide, bis(2,4,6-trimethylbenzoyl)phenylphosphine oxide, bis(2,5, 6-trimethylbenzoyl)-2,4,4-trimethylpentylphosphine oxide, and salts of these (e.g., sodium salts, lithium salts).

Preferred as (bis)acylphosphine oxides and salts thereof are 2,4,6-trimethylbenzoyldiphenylphosphine oxide, 2,4,6-trimethylbenzoylmethoxyphenylphosphine oxide, bis(2,4,6-trimethylbenzoyl)phenylphosphine oxide, and sodium salts of 2,4,6-trimethylbenzoylphenylphosphine oxide.

Examples of the thioxanthones or quaternary ammonium salts of thioxanthones include thioxanthone, 2-chlorothioxanthen-9-one, 2-hydroxy-3-(9-oxy-9H-thioxanthen-4-yloxy)-N,N,N-trimethyl-propaneaminium chloride, 2-hydroxy-3-(1-methyl-9-oxy-9H-thioxanthen-4-yloxy)-N,N,N-trimethyl-propaneaminium chloride, 2-hydroxy-3-(9-oxo-9H-thioxanthen-2-yloxy)-N,N,N-trimethyl-propaneaminium chloride, 2-hydroxy-3-(3,4-dimethyl-9-oxo-9H-thioxanthen-2-yloxy)-N,N,N-trimethyl-1-propaneaminium chloride, 2-hydroxy-3-(3,4-dimethyl-9H-thioxanthen-2-yloxy)-N,N,N-trimethyl-1-propaneaminium chloride, and 2-hydroxy-3-(1,3,4-trimethyl-9-oxo-9H-thioxanthen-2-yloxy)-N,N,N-trimethyl-1-propaneaminium chloride.

Among these thioxanthones and quaternary ammonium salts of thioxanthones, preferred as a thioxanthone is 2-chlorothioxanthen-9-one, and preferred as a quaternary ammonium salt of thioxanthones is 2-hydroxy-3-(3,4-dimethyl-9H-thioxanthen-2-yloxy)-N,N,N-trimethyl-1-propaneaminium chloride.

Example of the ketals include benzyl dimethyl ketal, and benzyl diethyl ketal.

Examples of the α-diketones include diacetyl, benzyl, camphorquinone, 2,3-pentadione, 2,3-octadione, 9,10-phenanthrenequinone, 4,4'-oxybenzyl, and acenaphthenequinone. Preferred is camphorquinone for its maximum absorption wavelength occurring in the visible light region.

Examples of the benzoin alkyl ethers include benzoin methyl ether, benzoin ethyl ether, benzoin isopropyl ether, and benzoin isobutyl ether.

Examples of the α-aminoketones include 2-methyl-1-[4-(methylthio)phenyl]-2-morpholinopropan-1-one.

Of these photopolymerization initiators, it is preferable to use at least one selected from the group consisting of (bis)acylphosphine oxides and salts thereof, and a-diketones.

Preferred for use as chemical polymerization initiators are azo compounds and organic peroxides. The azo compounds and organic peroxides are not particularly limited, and known compounds may be used. Typical examples of the azo compounds include azobisisobutyronitrile. Typical examples of the organic peroxides include ketone peroxides, hydroperoxides, diacyl peroxides, dialkyl peroxides, peroxyketals, peroxyesters, and peroxydicarbonates.

Examples of the ketone peroxides include methyl ethyl ketone peroxide, methyl isobutyl ketone peroxide, methyl cyclohexanone peroxide, and cyclohexanone peroxide.

Examples of the hydroperoxides include 2,5-dimethylhexane-2,5-dihydroperoxide, diisopropylbenzene hydroperoxide, cumene hydroperoxide, and t-butyl hydroperoxide.

Examples of the diacyl peroxides include acetyl peroxide, isobutyryl peroxide, benzoyl peroxide, decanoyl peroxide, 3,5,5-trimethylhexanoyl peroxide, 2,4-dichlorobenzoyl peroxide, and lauroyl peroxide.

Examples of the dialkyl peroxides include di-t-butyl peroxide, dicumyl peroxide, t-butylcumyl peroxide, 2,5-dimethyl-2,5-di(t-butylperoxy)hexane, 1,3-bis(t-butylperoxyisopropyl)benzene, and 2,5-dimethyl-2,5-di(t-butylperoxy)-3-hexyne.

Examples of the peroxy ketals include 1,1-bis(t-butylperoxy)-3,3,5-trimethylcyclohexane, 1,1-bis(t-butylperoxy) cyclohexane, 2,2-bis(t-butylperoxy)butane, 2,2-bis(t-butylperoxy)octane, and n-butyl 4,4-bis(t-butylperoxy) valerate.

Examples of the peroxyesters include α-cumyl peroxyneodecanoate, t-butyl peroxyneodecanoate, t-butyl peroxypivalate, 2,2,4-trimethylpentyl peroxy-2-ethylhexanoate, t-amyl peroxy-2-ethylhexanoate, t-butyl peroxy-2-ethylhexanoate, di-t-butyl peroxyisophthalate, di-t-butyl peroxyhexahydroterephthalate, t-butyl peroxy-3,3,5-trimethylhexanoate, t-butyl peroxyacetate, t-butyl peroxybenzoate, and t-butyl peroxymaleic acid.

Examples of the peroxydicarbonates include di-3-methoxyperoxydicarbonate, di(2-ethylhexyl)peroxydicarbonate, bis(4-t-butylcyclohexyl)peroxydicarbonate, diisopropylperoxydicarbonate, di-n-propylperoxydicarbonate, di(2-ethoxyethyl)peroxydicarbonate, and diallylperoxydicarbonate.

From an overall balance of safety, storage stability, and radical generating potential, preferred among these organic peroxides are diacyl peroxides, particularly benzoyl peroxide.

The content of polymerization initiator (C) is preferably 0.01 to 10 parts by mass, more preferably 0.1 to 7 parts by mass, even more preferably 0.15 to 6 parts by mass, particularly preferably 0.5 to 5 parts by mass relative to 100 parts by mass of a mixture of the (meth)acrylic acid ester compound (A) having two or more (meth)acryloyloxy groups per molecule, and the mono(meth)acrylic acid ester compound (B).

Polymerization Accelerator

A dental restoration material composition of the present invention may further comprise a polymerization accelerator. Examples of the polymerization accelerator include amines, sulfinic acids and salts thereof, aldehydes, borate compounds, triazine compounds, and thiol compounds. The polymerization accelerator may be used alone, or two or more thereof may be used in combination. A certain preferred embodiment is, for example, a dental restoration material composition, in which the polymerization initiator (C) comprises a photopolymerization initiator, and that comprises a polymerization accelerator of the photopolymerization initiator, and the polymerization accelerator is a tertiary amine.

The amines can be classified into aliphatic amines and aromatic amines. Examples of the aliphatic amines include primary aliphatic amines such as n-butylamine, n-hexylamine, and n-octylamine; secondary aliphatic amines such as diisopropylamine, dibutylamine, and N-methylethanolamine; and tertiary aliphatic amines such as N,N-dimethylaminoethyl methacrylate, N-methyldiethanolamine, N-ethyldiethanolamine, N-n-butyldiethanolamine, N-lauryldiethanolamine, 2-(dimethylamino)ethyl methacrylate, N-methyldiethanolamine dimethacrylate, N-ethyldiethanolamine dimethacrylate, triethanolamine monomethacrylate, triethanolamine dimethacrylate, triethanolamine trimethacrylate, triethanolamine, trimethylamine, triethylamine, and tributylamine. In view of curability and storage stability of the composition, preferred for use are tertiary aliphatic amines, more preferably N,N-dimethylaminoethyl methacrylate, N-methyldiethanolamine, and triethanolamine.

Examples of the aromatic amines include N,N-bis(2-hydroxyethyl)-3,5-dimethylaniline, N,N-bis(2-hydroxyethyl)-p-toluidine, N,N-bis(2-hydroxyethyl)-3,4-dimethylaniline, N,N-bis(2-hydroxyethyl)-4-ethylaniline, N,N-bis(2-hydroxyethyl)-4-isopropylaniline, N,N-bis(2-hydroxyethyl)-4-t-butylaniline, N,N-bis(2-hydroxyethyl)-3,5-di-isopropylaniline, N,N-bis(2-hydroxyethyl)-3,5-di-t-butylaniline, N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-isopropylaniline, N,N-dimethyl-4-t-butylaniline, N,N-dimethyl-3,5-di-t-butylaniline, ethyl 4-(N,N-dimethylamino)benzoate, methyl 4-(N,N-dimethylamino)benzoate, n-butoxyethyl 4-(N,N-dimethylamino)benzoate, 2-(methacryloyloxy)ethyl 4-(N,N-dimethylamino)benzoate, 4-(N,N-dimethylamino)benzophenone, and butyl 4-(N,N-dimethylamino)benzoate. In view of the ability to improve the curability of the dental restoration material composition, preferred for use is at least one selected from the group consisting of N,N-bis(2-hydroxyethyl)-p-toluidine, ethyl 4-(N,N-dimethylamino)benzoate, n-butoxyethyl 4-(N,N-dimethylamino)benzoate, and 4-(N,N-dimethylamino)benzophenone.

Examples of the sulfinic acids and salts thereof include p-toluenesulfinic acid, sodium p-toluenesulfinate, potassium p-toluenesulfinate, lithium p-toluenesulfinate, calcium p-toluenesulfinate, benzenesulfinic acid, sodium benzenesulfinate, potassium benzenesulfinate, lithium benzenesulfinate, calcium benzenesulfinate, 2,4,6-trimethylbenzenesulfinic acid, sodium 2,4,6-trimethylbenzenesulfinate, potassium 2,4,6-trimethylbenzenesulfinate, lithium 2,4,6-trimethylbenzenesulfinate, calcium 2,4,6-trimethylbenzenesulfinate, 2,4,6-triethylbenzenesulfinic acid, sodium 2,4,6-triethylbenzenesulfinate, potassium 2,4,6-triethylbenzenesulfinate, lithium 2,4,6-triethylbenzenesulfinate, calcium 2,4,6-triethylbenzenesulfinate, 2,4,6-triisopropylbenzenesulfinic acid, sodium 2,4,6-triisopropylbenzenesulfinate, potassium 2,4,6-triisopropylbenzenesulfinate, lithium 2,4,6-triisopropylbenzenesulfinate, and calcium 2,4,6-triisopropylbenzenesulfinate. Preferred are sodium benzenesulfinate, sodium p-toluenesulfinate, and sodium 2,4,6-triisopropylbenzenesulfinate.

Examples of the aldehydes include terephthalaldehyde, and benzaldehyde derivatives. Examples of the benzaldehyde derivatives include dimethylaminobenzaldehyde, p-methoxybenzaldehyde, p-ethoxybenzaldehyde, and p-n-octyloxybenzaldehyde. In view of the ability to improve the curability of the dental restoration material composition, preferred for use is p-n-octyloxybenzaldehyde.

The borate compounds are preferably arylborate compounds. Examples of the arylborate compounds include borate compounds having 1 to 4 aryl groups per molecule.

Examples of the borate compounds having one aryl group per molecule include trialkylphenylboron, trialkyl(p-chlorophenyl)boron, trialkyl(p-fluorophenyl)boron, trialkyl[3,5-bis(trifluoromethyl)phenyl]boron, trialkyl[3,5-bis(1,1,1,3,3,3-hexafluoro-2-methoxy-2-propyl)phenyl]boron, trialkyl(p-nitrophenyl)boron, trialkyl(m-nitrophenyl)boron, trialkyl(p-butylphenyl)boron, trialkyl(m-butylphenyl)boron, trialkyl(p-butyloxyphenyl)boron, trialkyl(m-butyloxyphenyl)boron, trialkyl(p-octyloxyphenyl)boron, trialkyl(m-octyloxyphenyl)boron (the alkyl groups in these examples are, for example, n-butyl, n-octyl, or n-dodecyl), and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

Examples of the borate compounds having two aryl groups per molecule include dialkyl diphenylboron, dialkyl di(p-chlorophenyl)boron, dialkyl di(p-fluorophenyl)boron, dialkyl di[3,5-bis(trifluoromethyl)phenyl]boron, dialkyl di[3,5-bis(1,1,1,3,3,3-hexafluoro-2-methoxy-2-propyl)phenyl]boron, dialkyl di(p-nitrophenyl)boron, dialkyl di(m-nitrophenyl)boron, dialkyl di(p-butylphenyl)boron, dialkyl di(m-butylphenyl)boron, dialkyl di(p-butyloxyphenyl)boron, dialkyl di(m-butyloxyphenyl)boron, dialkyl di(p-octyloxyphenyl)boron, dialkyl di(m-octyloxyphenyl)boron (the alkyl groups in these examples are, for example, n-butyl, n-octyl, or n-dodecyl), and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

Examples of the borate compounds having three aryl groups per molecule include monoalkyl triphenylboron, monoalkyl tri(p-chlorophenyl)boron, monoalkyl tri(p-fluorophenyl)boron, monoalkyl tri[3,5-bis(trifluoromethyl)phenyl]boron, monoalkyl tri[3,5-bis(1,1,1,3,3,3-hexafluoro-2-methoxy-2-propyl)phenyl]boron, monoalkyl tri(p-nitrophenyl)boron, monoalkyl tri(m-nitrophenyl)boron, monoalkyl tri(p-butylphenyl)boron, monoalkyl tri(m-butylphenyl)boron, monoalkyl tri(p-butyloxyphenyl)boron, monoalkyl tri(m-butyloxyphenyl)boron, monoalkyl tri(p-octyloxyphenyl)boron, monoalkyl tri(m-octyloxyphenyl) boron (the alkyl groups in these examples are, for example, n-butyl, n-octyl, or n-dodecyl), and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

Examples of the borate compounds having four aryl groups per molecule include tetraphenylboron, tetrakis(p-chlorophenyl)boron, tetrakis(p-fluorophenyl)boron, tetrakis[3,5-bis(trifluoromethyl)phenyl]boron, tetrakis[3,5-bis(1,1,1,3,3,3-hexafluoro-2-methoxy-2-propyl)phenyl]boron, tetrakis(p-nitrophenyl)boron, tetrakis(m-nitrophenyl)boron, tetrakis(p-butylphenyl)boron, tetrakis(m-butylphenyl)boron, tetrakis(p-butyloxyphenyl)boron, tetrakis(m-butyloxyphenyl)boron, tetrakis(p-octyloxyphenyl)boron, tetrakis(m-octyloxyphenyl)boron, (p-fluorophenyl)triphenylboron, [3,5-bis(trifluoromethyl)phenyl]triphenylboron, (p-nitrophenyl)triphenylboron, (m-butyloxyphenyl)triphenylboron, (p-butyloxyphenyl)triphenylboron, (m-octyloxyphenyl)triphenylboron, (p-octyloxyphenyl)triphenylboron, and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

In view of storage stability, preferred as arylborate compounds are borate compounds having three or four aryl groups per molecule. The arylborate compound may be used alone, or two or more thereof may be used in combination.

Examples of the triazine compounds include 2,4,6-tris(trichloromethyl)-s-triazine, 2,4,6-tris(tribromomethyl)-s-triazine, 2-methyl-4,6-bis(trichloromethyl)-s-triazine, 2-methyl-4,6-bis(tribromomethyl)-s-triazine, 2-phenyl-4,6-bis(trichloromethyl)-s-triazine, 2-(p-methoxyphenyl)-4,6-bis(trichloromethyl)-s-triazine, 2-(p-methylthiophenyl)-4,6-bis(trichloromethyl)-s-triazine, 2-(p-chlorophenyl)-4,6-bis(trichloromethyl)-s-triazine, 2-(2,4-dichlorophenyl)-4,6-bis(trichloromethyl)-s-triazine, 2-(p-bromophenyl)-4,6-bis(trichloromethyl)-s-triazine, 2-(p-tolyl)-4,6-bis(trichloromethyl)-s-triazine, 2-n-propyl-4,6-bis(trichloromethyl)-s-triazine, 2-($\alpha,\alpha,\beta$-trichloroethyl)-4,6-bis(trichloromethyl)-s-triazine, 2-styryl-4,6-bis(trichloromethyl)-s-triazine, 2-[2-(p-methoxyphenyl)ethenyl]-4,6-bis(trichloromethyl)-s-triazine, 2-[2-(o-methoxyphenyl)ethenyl]-4,6-bis(trichloromethyl)-s-triazine, 2-[2-(p-butoxyphenyl)ethenyl]-4,6-bis(trichloromethyl)-s-triazine, 2-[2-(3,4-dimethoxyphenyl)ethenyl]-4,6-bis(trichloromethyl)-s-triazine, 2-[2-(3,4,5-trimethoxyphenyl)ethenyl]-4,6-bis(trichloromethyl)-s-triazine, 2-(1-naphthyl)-4,6-bis(trichloromethyl)-s-triazine, 2-(4-biphenylyl)-4,6-bis(trichloromethyl)-s-triazine, 2-[2-{N,N-bis(2-hydroxyethyl)amino}ethoxy]-4,6-bis(trichloromethyl)-s-triazine, 2-[2-{N-hydroxyethyl-N-ethylamino}ethoxy]-4,6-bis(trichloromethyl)-s-triazine, 2-[2-{N-hydroxyethyl-N-methylamino}ethoxy]-4,6-bis(trichloromethyl)-s-triazine, and 2-[2-{N,N-diallylamino}ethoxy]-4,6-bis(trichloromethyl)-s-triazine.

In view of polymerization activity, preferred as a triazine compound is 2,4,6-tris(trichloromethyl)-s-triazine. In view of storage stability, preferred are 2-phenyl-4,6-bis(trichloromethyl)-s-triazine, 2-(p-chlorophenyl)-4,6-bis(trichloromethyl)-s-triazine, and 2-(4-biphenylyl)-4,6-bis(trichloromethyl)-s-triazine. The triazine compounds may be used alone, or two or more thereof may be used in combination.

Examples of the thiol compounds include 3-mercaptopropyltrimethoxysilane, 2-mercaptobenzoxazole, decanethiol, and thiobenzoic acid.

The content of the polymerization accelerator is not particularly limited, and is preferably 0.01 to 10 parts by mass, more preferably 0.1 to 7 parts by mass, even more preferably 0.2 to 5 parts by mass relative to 100 parts by mass of a mixture of the (meth)acrylic acid ester compound (A) having two or more (meth)acryloyloxy groups per molecule, and the mono(meth)acrylic acid ester compound (B).

Organic-Inorganic Composite Filler (D)

In view of low polymerization shrinkage stress and excellence of mechanical strength and polishability in the cured product, a dental restoration material composition of the present invention comprises an organic-inorganic composite filler (D). The organic-inorganic composite filler (D) has an average particle diameter of preferably 3 to 25 µm, more preferably 4 to 20 µm, even more preferably 5 to 20 µm. When the average particle diameter of organic-inorganic composite filler (D) is too small, ease of handling may decrease as a result of increased stickiness of the dental restoration material composition. An excessively large average particle diameter creates roughness in the paste, and ease of handling may decrease. The method of measurement of average particle diameter is as described in the EXAMPLES section below. In the present invention, "organic-inorganic composite filler" indicates a filler containing an inorganic filler, and a polymer of a polymerizable monomer.

The organic-inorganic composite filler (D) may be used alone, or two or more thereof may be used in combination. In view of ease of handling of a dental restoration material composition of the present invention in a paste state before cure, it is preferable to use two or more organic-inorganic composite fillers of different average particle diameters in combination. In certain embodiments, the organic-inorganic composite filler (D) preferably comprises an organic-inorganic composite filler having an average particle diameter of 10 µm to 50 µm, and an organic-inorganic composite filler having an average particle diameter of 3 µm or more and less than 10 µm. More preferably, the organic-inorganic composite filler (D) comprises an organic-inorganic composite filler having an average particle diameter of 13 µm to 25 µm, and an organic-inorganic composite filler having an average particle diameter of 3 µm to 8 µm.

Preferably, the organic-inorganic composite filler (D) comprises two organic-inorganic composite fillers having different refractive indices (nD), preferably an organic-inorganic composite filler (D-1) having a refractive index of 1.50<nD 1.70, and an organic-inorganic composite filler (D-2) having a refractive index of 1.45 nD 1.50. The absolute value of the refractive index difference of two organic-inorganic composite fillers is preferably 0.01 to 0.20, more preferably 0.01 to 0.10, even more preferably 0.02 to 0.10. The presence of two organic-inorganic composite fillers having different refractive indices imparts light diffusion properties, and improves shade conformity. The method of measurement of refractive index is as described in the EXAMPLES section below.

In view of ease of handling and polymerization shrinkage stress, the content of organic-inorganic composite filler (D) is preferably 30 to 75 mass %, more preferably 30 to 70 mass %, even more preferably 30 to 60 mass % of the total amount of the dental restoration material composition. An increased content of organic-inorganic composite filler (D) may create roughness in paste properties, or may harm spreadability. The polymerization shrinkage stress may increase when the content of organic-inorganic composite filler (D) is too low. When a dental restoration material composition of the present invention contains an inorganic filler (E) (described later), the mass ratio of the content of organic-inorganic composite filler (D) and the content of inorganic filler (E) is not particularly limited. It is, however, preferable that the content of organic-inorganic composite filler (D) exceeds the content of inorganic filler (E). That is, the mass ratio (D)/(E) is preferably greater than 1. With the organic-inorganic composite filler (D) being greater in content than the inorganic filler (E), the dental restoration material composition has less stickiness, good formability, and improved polishability. In the present invention, the total content of inorganic filler (E) and organic-inorganic composite filler (D) may be 50 mass % or more, 60 mass % or more, or 70 mass % or more in the dental restoration material composition. The total content of inorganic filler (E) and organic-inorganic composite filler (D) may be 83 mass % or less.

In the present invention, the organic-inorganic composite filler (D) is preferably one in which an inorganic filler (d1) is dispersed in the organic matrix, and the method of preparation is not particularly limited. For example, a known polymerizable monomer (d2) and a known polymerization initiator (d3) may be added to a known inorganic filler (d1) to prepare a paste form, and, after solution polymerization, suspension polymerization, emulsion polymerization, or bulk polymerization, the polymer may be pulverized to form the organic-inorganic composite filler (D).

The polymerizable monomer (d2) is not particularly limited, and polymerizable monomers such as those presented as example polymerizable monomers may be used, including the (meth)acrylic acid ester compound (A) having two or more (meth)acryloyloxy groups per molecule, and the mono (meth)acrylic acid ester compound (B). It is also possible to use polymerizable monomers having the same compositions as these polymerizable monomers. It is preferable to use a polymerizable monomer that has undergone a purification step. When the polymerizable monomer used has not undergone a purification step, impurities in the polymerizable monomer may impart a color to the organic-inorganic composite filler (D), and it may not be possible to adjust the color to the desired shade. In other cases, the dental restoration material composition may suffer from poor aesthetic quality after cure. A certain preferred embodiment is, for example, a dental restoration material composition in which the organic matrix comprises a polymer of the polymerizable monomer (d2), and the polymerizable monomer (d2) comprises the (meth)acrylic acid ester compound (A) having two or more (meth)acryloyloxy groups per molecule.

The polymerization initiator (d3) is not particularly limited, and a known polymerization initiator may be used. Examples include photopolymerization initiators using light such as ultraviolet light or visible light, and chemical polymerization initiators that utilize, for example, a reaction between a peroxide and an accelerator, or heat. The polymerization initiator (d3) may be appropriately selected from the polymerization initiators exemplified as polymerization initiator (C), and may be the same or different from the polymerization initiator (C).

The inorganic filler (d1) has an average primary particle diameter of preferably 0.5 μm or less, more preferably 0.005 to 0.3 μm, even more preferably 0.01 to 0.2 μm. When the average primary particle diameter of the inorganic filler (d1) used in the organic-inorganic composite filler (D) is more than 0.5 μm, it may not be possible to obtain desirable polishability in the dental restoration material composition after cure. A certain preferred embodiment is, for example, a dental restoration material composition in which the organic-inorganic composite filler (D) is an organic-inorganic composite filler having an average particle diameter of 3 μm to 25 μm, and in which an inorganic filler (d1) having an average primary particle diameter of 0.5 μm or less is dispersed in the organic matrix. The method of measurement of average primary particle diameter is as described in the EXAMPLES section below.

The content of the inorganic filler (d1) in the organic-inorganic composite filler (D) is preferably 40 to 90 mass %, more preferably 45 to 85 mass %, even more preferably 55 to 85 mass % in the total amount of the organic-inorganic composite filler (D). With these contents of inorganic filler (d1), the mechanical strength of the dental restoration material composition after cure can be controlled at the preferred value.

The material of inorganic filler (d1) is not particularly limited, and the inorganic fillers exemplified as inorganic filler (E) (described later), or inorganic ultrafine particles may be used. In view of improving the affinity to the polymerizable monomers or improving the mechanical strength of the organic-inorganic composite filler through increased chemical binding with the polymerizable monomers, the inorganic filler (d1) may be used after an optional surface treatment with a known surface treatment agent such as a silane coupling agent. The surface treatment agent and the surface treatment method may be any of the treatment agents and methods exemplified for the inorganic filler (E) described below.

The inorganic ultrafine particles used for the inorganic filler (d1) may be any known inorganic ultrafine particles, as with the case of the inorganic filler (E) described below. The preferred materials are also the same as in the inorganic filler (E) below.

The preferred range and the method of measurement of the average primary particle diameter of inorganic ultrafine particles used for the inorganic filler (d1) are the same as in the inorganic filler (E) described below.

Because the inorganic ultrafine particles used for the inorganic filler (d1) are used in the organic-inorganic composite filler (D) with the polymerizable monomer (d2), it is preferable that the inorganic ultrafine particles be subjected to a surface treatment with a surface treatment agent in advance, in order to improve the affinity to the polymerizable monomer (d2) or to improve the mechanical strength of the organic-inorganic composite filler (D) through increased chemical binding with the polymerizable monomer (d2). The surface treatment agent and the surface treatment method may be any of the treatment agents and methods exemplified for the inorganic filler (E) described below.

Depending on intended use, additional components such as known polymerization inhibitors, pH adjusters, ultraviolet absorbers, antioxidants, antimicrobial agents, fluorescent agents, surface active agents, dispersants, and thickeners may be added to the organic-inorganic composite filler (D), provided that such additional components do not interfere with the effects of the invention. These may be used alone, or two or more thereof may be used in combination. Examples of the polymerization inhibitors include 2,6-di-butylhydroxytoluene, hydroquinone, dibutylhydroquinone, dibutylhydroquinonemonomethyl ether, and 2,6-t-butylphenol. These may be used alone, or two or more thereof may be used in combination. The ultraviolet absorbers may be known compounds, for example, such as triazine ultraviolet absorbers, benzotriazole ultraviolet absorbers, benzophenone ultraviolet absorbers, benzoate ultraviolet absorbers, and hindered amine light stabilizers. These may be used alone, or two or more thereof may be used in combination.

Inorganic Filler (E)

In view of mechanical strength of the cured product, a dental restoration material composition of the present invention preferably comprises an inorganic filler (E). The material and type of inorganic filler (E) is not particularly limited, as long as it is not detrimental to the effects of the present invention, and known inorganic fillers used for dental composite resins and other such applications may be used, including, for example, various types of glasses, and agglomerated particles.

Examples of such glasses (containing silica as a main component, and optionally containing oxides of heavy metals, boron, zirconium, titanium, and aluminum) include:
  glass powders of common compositions, for example, such as fused silica, quartz, soda lime-silica glass, E glass, C glass, borosilicate glass [PYREX® glass]; and
  glass powders for dental use, for example, such as strontium·boroaluminosilicate glass E-3000 (manufactured by ESSTECH), barium boroaluminosilicate glass GM27884, 8235 Series (e.g., 8235 UF0.7) (manufactured by SCHOTT), barium silicate glass E-2000 (manufactured by ESSTECH), lanthanum glass-ceramics GM31684 (manufactured by SCHOTT), and fluoroaluminosilicate glass GM35429, G018-091, G018-117 (manufactured by SCHOTT).

Other examples include various types of ceramics, composite oxides, diatomaceous earth, kaolin, clay minerals (e.g., montmorillonite), activated earth, synthetic zeolite, mica, calcium fluoride, ytterbium fluoride, yttrium fluoride, calcium phosphate, barium sulfate, zirconium dioxide, titanium dioxide, and hydroxyapatite.

In view of refractive index, preferred are barium glass, silica-zirconia composite oxide, silica-titania composite oxide, silica-alumina-zirconia composite oxide, crystal quartz, and ytterbium fluoride.

The inorganic filler (E) may be used alone, or two or more thereof may be used in combination. The shape of the inorganic filler is not particularly limited, and the inorganic filler is preferably a spherical, a near spherical, or an irregularly shaped inorganic filler. Here, "near spherical" means that round-shaped particles observed in a unit field of a captured image of fillers taken with a scanning electron microscope (hereinafter, simply "SEM") have an average uniformity of 0.6 or more when a particle along a direction orthogonal to the maximum diameter is divided by the maximum diameter. In view of improving the mechanical strength of a cured product of the dental restoration material composition, the inorganic filler (E) is preferably an irregularly shaped filler.

In view of ease of handling of the dental restoration material composition and polishability of the cured product, the average primary particle diameter of inorganic filler (E) is preferably 1.2 μm or less, more preferably 0.5 μm or less, even more preferably 0.3 μm or less. With a reduced average primary particle diameter, the paste has reduced roughness, and ease of handling improves as a result of improved spreadability. On the other hand, the polishability of the cured product may decrease when the average primary particle diameter is too large. The method of measurement of average primary particle diameter is as described in the EXAMPLES section below.

The inorganic filler (E) may be agglomerated particles (an aggregated filler) prepared by aggregating inorganic ultrafine particles or various types of glass. The inorganic ultrafine particles may be any known inorganic ultrafine particles.

The inorganic ultrafine particles have an average primary particle diameter of preferably 5 to 50 nm, more preferably 10 to 40 nm. The average primary particle diameters of inorganic ultrafine particles can be measured by taking an electron micrograph of inorganic ultrafine particles, and calculating a mean value of primary particle diameters of randomly selected 100 ultrafine particles. When the inorganic ultrafine particles are nonspherical, the primary particle diameter is the arithmetic mean value of the maximum and minimum lengths of inorganic ultrafine particles.

The inorganic ultrafine particles may be any known inorganic ultrafine particles. Preferred examples include inorganic oxide particles such as silica, alumina, titania, and zirconia, or composite oxide particles of these, and calcium phosphate, hydroxyapatite, yttrium fluoride, and ytterbium fluoride. Preferably, the inorganic oxide particles are, for example, silica, alumina, or titania particles prepared by flame hydrolysis, for example, such as Aerosil®, Aeroxide® AluC, and Aeroxide® TiO$_2$ P25 manufactured by Nippon Aerosil Co., Ltd. under these trade names, and VP Zirconium Oxide 3-YSZ, and VP Zirconiumxide 3-YSZ PH manufactured by EVONIK.

In view of ease of handling, the content of inorganic filler (E) is preferably 1 to 50 mass % relative to the total amount of the dental restoration material composition. The preferred content of inorganic filler (E) is 1 to 40 mass % when the average primary particle diameter is 0.3 μm or less, and is 1 to 20 mass % when the average primary particle diameter is 0.1 μm or less. The preferred content of inorganic filler (E) is 1 to 10 mass % when the average primary particle diameter is 50 nm or less. The preferred content of inorganic filler (E) is 3 to 50 mass % when the inorganic filler (E) is an aggregated filler.

In view of strengthening the binding with the polymerizable monomers, the inorganic filler (E) may be used after being optionally subjected to a surface treatment in advance with a known surface treatment agent such as a silane coupling agent. Examples of the surface treatment agent include organic silicon compounds such as γ-methacryloyloxyalkyltrimethoxysilane (3 to 12 carbon atoms between the methacryloyloxy group and the silicon atom), γ-methacryloyloxyalkyltriethoxysilane (3 to 12 carbon atoms between the methacryloyloxy group and the silicon atom), vinyltrimethoxysilane, vinylethoxysilane, and vinyltriacetoxysilane.

The amount of surface treatment agent used for treatment is preferably 0.05 to 100 parts by mass, more preferably 0.10 to 50 parts by mass relative to 100 parts by mass of the inorganic filler (E) subjected to the surface treatment.

The surface treatment method may be any known method, including, for example, a method that adds a surface treatment agent by spraying it while vigorously stirring inorganic filler (E), a method that disperses or dissolves the inorganic filler (E) and a surface treatment agent in a suitable solvent, and removes the solvent, and a method that transforms the alkoxy group of a surface treatment agent into a silanol group by hydrolysis with an acid catalyst in an aqueous solution, and attaches the silanol group to the surface of inorganic filler (E) in the aqueous solution before removing water. Any of these methods can achieve a surface treatment by completing the reaction between a surface treatment agent and the surface of inorganic filler (E) under applied heat in a range of typically 50 to 150° C.

Polymer (F)

In view of reducing polymerization shrinkage stress, a dental restoration material composition of the present invention may further comprise a polymer (F). The type of polymer is not particularly limited. Examples include a (meth)acrylic polymer, an isoprene polymer, a butadiene polymer, a hydrogenation product of a block copolymer of a styrene polymer block and a butadiene polymer block, a hydrogenation product of a block copolymer of a styrene polymer block and an isoprene polymer block, and a prepolymer (F-1) containing these structures (described below). The polymer (F) may be used alone, or two or more thereof may be used in combination.

Prepolymer (F-1)

In view of reducing polymerization shrinkage stress, a dental restoration material composition of the present invention preferably comprises a prepolymer (F-1) as a polymer (F). Here, "prepolymer" refers to an intermediate of a polymerization reaction of a polymerizable monomer after the reaction is stopped at an appropriate point, or a polymer having a functional group introduced therein after polymerization. In either case, the prepolymer has an unreacted polymerizable functional group that enables further polymerization. The prepolymer (F-1) may be used alone, or two or more thereof may be used in combination.

The unreacted polymerizable functional group of the prepolymer (F-1) is not particularly limited. Examples of the polymerizable functional group include a carbon-carbon double bond, a vinyl group, a vinyloxy group, a (meth)allyl group, a (meth)acryloyl group, a maleoyl group, a styryl group, and a cinnamoyl group. The polymerizable functional group is preferably a (meth)acryloyl group, more preferably a (meth)acryloyloxy group or a (meth)acrylamide group. The number of unreacted polymerizable functional groups in prepolymer (F-1) is, on average, preferably 1 or more, more preferably two or more per molecule of prepolymer (F-1). In view of an even superior polymerization-shrinkage-stress reducing effect, the number of unreacted polymerizable functional groups is even more preferably 5 or more, particularly preferably 10 or more, and may be 15 or more, 20 or more, or 25 or more. The number of unreacted polymerizable functional groups is preferably 1,000 or less, more preferably 500 or less. In view of an even superior polymerization-shrinkage-stress reducing effect, the number of unreacted polymerizable functional groups is even more preferably 100 or less, particularly preferably 50 or less. The method of measurement of the number of unreacted polymerizable functional groups in prepolymer (F-1) is not particularly limited. For example, the number of unreacted polymerizable functional groups can be determined by measuring the concentration (mol/g) of unreacted polymerizable functional groups in the prepolymer by NMR analysis, and multiplying the measured concentration by the weight-average molecular weight of prepolymer (F-1) described below. More specifically, the number of unreacted polymerizable functional groups can be determined by using the method described in the EXAMPLES section below.

The molecular weight of prepolymer (F-1) is not particularly limited. For advantages such as enhancement of the effectiveness of the present invention, the weight-average molecular weight of prepolymer (F-1) is preferably 1,000 or more. In view of an even superior polymerization-shrinkage-stress reducing effect, the weight-average molecular weight of prepolymer (F-1) is more preferably 5,000 or more, even more preferably 10,000 or more. The weight-average molecular weight of prepolymer (F-1) is preferably 1,000,000 or less. In view of an even superior polymerization-shrinkage-stress reducing effect, the weight-average molecular weight of prepolymer (F-1) is more preferably 500,000 or less, even more preferably 300,000 or less, particularly preferably 100,000 or less, and may be 80,000 or less, or 60,000 or less. The method of measurement of the weight-average molecular weight of prepolymer (F-1) is not particularly limited. For example, the weight-average molecular weight of prepolymer (F-1) can be measured by GPC, more specifically, the method described in the EXAMPLES section below.

The content of the prepolymer in a dental restoration material composition of the present invention is not particularly limited. However, in view of considerations such as the stability of consistency, polymerization shrinkage stress, and ease of handling of the dental restoration material composition obtained, and the mechanical strength of the cured product obtained, the prepolymer content is preferably 0.5 mass % or more, more preferably 1 mass % or more, even more preferably 3 mass % or more, and is preferably 20 mass % or less, more preferably 18 mass % or less, even more preferably 16 mass % or less based on the mass of the dental restoration material composition. The prepolymer content may be 12 mass % or less, or 8 mass % or less.

Dental Restoration Material Composition

Depending on intended use, a dental restoration material composition of the present invention may comprise components such as a pH adjuster, a ultraviolet absorber, an antioxidant, a colorant (for example, a pigment, a dye), a chain transfer agent, an antimicrobial agent, an X-ray contrast agent, a thickener, and a fluorescent agent, in addition to the foregoing components. These may be used alone, or two or more thereof may be used in combination. The polymerization inhibitor and ultraviolet absorber may be any of the polymerization inhibitors and ultraviolet absorbers exemplified as polymerization inhibitors and ultraviolet absorbers that may be added to the organic-inorganic composite filler (D).

The pigment may be any known pigment used for dental composite resins. The pigment may be an inorganic pigment and/or an organic pigment. Examples of the inorganic pigment include:

chromates such as chrome yellow, zinc yellow, and barium yellow;

ferrocyanides such as iron blue;

sulfides such as silver vermilion, cadmium yellow, zinc sulfide, and cadmium red;

sulfates such as barium sulfate, zinc sulfate, and strontium sulfate;

oxides such as antimony white, zinc white, titanium white, red iron oxide, iron black, and chromium oxide;

hydroxides such as aluminum hydroxide;

silicates such as calcium silicate, and ultramarine; and carbons such as carbon black, and graphite.

Examples of the organic pigment include:

nitroso compounds such as Naphthol Green B, and Naphthol Green Y;

nitro pigments such as Naphthol Yellow S, and Lithol Fast Yellow 2G;

insoluble azo pigments such as Permanent Red 4R, Brilliant Fast Scarlet, Hansa Yellow, and Benzidine Yellow;

poorly soluble azo pigments such as Lithol Red, Lake Red C, and Lake Red D;

soluble azo pigments such as Brilliant Carmine 6B, Permanent Red F5R, Pigment Scarlet 3B, and Bordeaux 10B;

phthalocyanine pigments such as phthalocyanine blue, phthalocyanine green, and sky blue;

basic compounds such as rhodamine lake, malachite green lake, and methyl violet lake; and acidic compounds such as peacock blue lake, eosin lake, and quinoline yellow lake.

The pigment may be used alone, or two or more thereof may be used in combination, and is appropriately selected according to the desired shade.

The pigment content in a dental restoration material composition of the present invention is appropriately adjusted according to the desired shade, and is not particularly limited. The pigment content is preferably at least 0.000001 parts by mass, more preferably at least 0.00001 parts by mass, and is preferably at most 5 parts by mass, more preferably at most 1 part by mass in 100 parts by mass of the dental restoration material composition. The pigment content is preferably 0.000001 to 5 parts by mass, more preferably 0.00001 to 1 parts by mass in 100 parts by mass of the dental restoration material composition.

Examples of the chain transfer agent include mercaptan compounds (such as n-octyl mercaptan, n-dodecyl mercaptan, t-dodecyl mercaptan, hexadecyl mercaptan, and n-octadecyl mercaptan), halogen compounds (such as carbon tetrachloride, methylene chloride, bromoform), unsaturated hydrocarbon compounds (such as 2,4-diphenyl-4-methyl-1-pentene, α-terpinene, dipentene, and terpinolene), thiols (such as mercaptoacetic acid, mercapto(2-ethylhexyl)acetate, mercapto(3-methoxybutyl)acetate, β-mercaptopropionic acid, β-mercaptomethyl propionate, 2-ethylhexyl β-mercaptopropionate, 3-methoxybutyl β-mercaptopropionate, 2-mercaptoethanol, and 3-mercapto-1,2-propanediol).

A dental restoration material composition of the present invention is low in polymerization shrinkage stress, and excels in mechanical strength and polishability in the form of a cured product. This makes a dental restoration material composition of the present invention suitable for use as a dental material. Specifically, a dental restoration material composition of the present invention can be suitably used as a dental material (particularly, a dental composite resin) for partial or whole replacement of natural tooth in the field of dentistry. Particularly, because of the low polymerization shrinkage stress, a dental restoration material composition of the present invention can be more suitably used as a bulk fill composite resin from among a range of dental composite resins.

EXAMPLES

The following specifically describes the present invention through Examples and Comparative Examples. However, the present invention is not limited to the following.

(Meth)Acrylic Acid Ester Compound (A) Having Two or More (Meth)Acryloyloxy Groups Per Molecule, Polymerizable Monomer (d2)
   D2.6E: 2,2-Bis[4-methacryloyloxypolyethoxyphenyl]propane (average number of moles of ethoxy group added: 2.6)
   UDMA: 2,2,4-Trimethylhexamethylenebis(2-carbamoyloxyethyl)dimethacrylate
   Bis-GMA: 2,2-bis[4-(3-methacryloyloxy-2-hydroxypropoxy)phenyl]propane
   3G: Triethylene glycol dimethacrylate
   9G: Polyethylene glycol #400 dimethacrylate
Mono(Meth)Acrylic Acid Ester Compound (B)
   POB-A: m-Phenoxybenzylacrylate (manufactured by Kyoeisha Chemical Co., Ltd.)
   POB-MA: m-Phenoxybenzylmethacrylate (manufactured by Kyoeisha Chemical Co., Ltd.)
Mono(Meth)Acrylic Acid Ester Compound
   IBX-MA: Isobornylmethacrylate (manufactured by Tokyo Chemical Industry Co., Ltd.)
   D-MA: Dodecyl methacrylate (manufactured by Fujifilm Wako Pure Chemical Industries, Ltd.)
Polymerization Initiator (C), Polymerization Initiator (d3)
   AIBN: Azobisisobutyronitrile
   CQ: Camphorquinone
   TMDPO: 2,4,6-Trimethylbenzoyldiphenylphosphine oxide
Polymerization Accelerator
   JJA: Ethyl 4-(N,N-dimethylamino)benzoate
Organic-Inorganic Composite Filler (D)
   The organic-inorganic composite filler (D) was prepared following the Production Examples 1 to 3 below.
Inorganic Filler (E), Inorganic Filler (d1)
   E-1
   A three-neck flask was charged with 100 g of a ultrafine silica particle powder (Aerosil® 130 manufactured by Nippon Aerosil Co., Ltd.; average primary particle diameter: 0.02 μm) prepared by flame hydrolysis, 20 g of γ-methacryloyloxypropyltrimethoxysilane, and 200 mL of a 0.3 mass % aqueous solution of acetic acid, and the mixture was stirred for 2 hours at room temperature. After removing water by freeze drying, a heat treatment was carried out at 80° C. for 5 hours to obtain an inorganic filler (E-1) (hereinafter, also referred to simply as "E-1").
   E-2
   A three-neck flask was charged with 100 g of bariumboroaluminosilicate glass (GM27884 NF180 grade, manufactured by SCHOTT; average primary particle diameter: 0.18 μm), 13 g of γ-methacryloyloxypropyltrimethoxysilane, and 200 mL of a 0.3 mass % aqueous solution of acetic acid, and the mixture was stirred for 2 hours at room temperature. After removing water by freeze drying, a heat treatment was carried out at 80° C. for 5 hours to obtain an inorganic filler (E-2) (hereinafter, also referred to simply as "E-2").
   E-3
   A three-neck flask was charged with 100 g of bariumboroaluminosilicate glass (GM27884 UF0.4 grade, manufactured by SCHOTT; average primary particle diameter: 0.4 μm), 9.4 g of γ-methacryloyloxypropyltrimethoxysilane, and 200 mL of a 0.3 mass % aqueous solution of acetic acid, and the mixture was stirred for 2 hours at room temperature. After removing water by freeze drying, a heat treatment was carried out at 80° C. for 5 hours to obtain an inorganic filler (E-3) (hereinafter, also referred to simply as "E-3").
   E-4
   A three-neck flask was charged with 100 g of bariumboroaluminosilicate glass (GM27884 UF1.2 grade, manufactured by SCHOTT; average primary particle diameter: 1.2 µm), 2.6 g of γ-methacryloyloxypropyltrimethoxysilane, and 200 mL of a 0.3 mass % aqueous solution of acetic acid, and the mixture was stirred for 2 hours at room temperature. After removing water by freeze drying, a heat treatment was carried out at 80° C. for 5 hours to obtain an inorganic filler (E-4) (hereinafter, also referred to simply as "E-4").

Production Example 1

E-1 as inorganic filler (d1) was mixed into a composition containing 1 mass % of AIBN dissolved therein beforehand as a polymerization initiator, and polymerizable monomers (d2) present in the mass ratio shown in Table 1. Here, E-1 was mixed in an amount of 100 parts by mass (inorganic filler content: 50 mass %) relative to 100 parts by mass of the composition. After forming the mixture into a paste form, the paste was subjected to thermal polymerization at 100° C. in a reduced pressure atmosphere for 5 hours. The polymerized and cured product was then pulverized with a vibration ball mill until the particle size reached a desired average particle diameter. As a surface treatment, the pulverized filler (100 g) was refluxed at 90° C. for 5 hours in a 200 mL ethanol solution containing 2 mass % γ-methacryloyloxypropyltrimethoxysilane. This produced an organic-inorganic composite filler (D-2).

Production Examples 2 and 3

Organic-inorganic composite fillers (D-1A) and (D-1B) of Production Examples 2 and 3 were prepared in the same manner as in Production Example 1, except that the inorganic fillers (d1) and polymerizable monomers (d2) shown in Table 1 were used, and that the conditions were changed to provide the desired content and average particle diameter for the inorganic filler (d1).

The following methods were used for the evaluations of physical properties and the measurements of materials in the Production Examples above, and in the Examples and Comparative Examples below.

Viscosity of Whole Polymerizable Monomer Mixture

The viscosity of a mixture of all the polymerizable monomers prepared in the Examples and Comparative Examples below, including the (meth)acrylic acid ester compound (A) having two or more (meth)acryloyloxy groups per molecule, and the mono(meth)acrylic acid ester compound (B) (hereinafter, such a mixture is also referred to simply as "whole polymerizable monomer mixture") was measured at 23° C. with a viscometer (TV-30E-type viscometer, manufactured by Toki Sangyo Co., Ltd.; JIS K-7117-2:1999 compliant; a cone-plate type), using 0.6 mL of a sample with a 0.8°×R24 conical rotor. The measurement was started after 1 minute of preheating, and the measured value after 5 minutes was taken as the viscosity of the mixture (n=1).

Refractive Index
Refractive Index of Filler

The filler (organic-inorganic composite filler (D) or inorganic filler (E)) was suspended in a solvent. By using a plurality of solvents, the suspension was adjusted to turn transparent while varying the refractive index of the solvent, and the suspension, upon turning transparent, was measured at 20° C. with an Abbe refractometer to determine the refractive index of the filler (n=1). The solvents used include pentane, hexane, cyclohexane, toluene, styrene, and aniline.

Flexural Strength

The dental restoration material compositions prepared in the Examples and Comparative Examples below were separately filled into a stainless-steel die (dimensions: 2 mm×2 mm×25 mm). With the dental restoration material composition being pressed between glass slides from top and

TABLE 1

| | Inorganic filler (d1) | | | | | | Organic-inorganic composite filler (D) | |
|---|---|---|---|---|---|---|---|---|
| | | Average primary particle diameter | Polymerizable monomer (d2)[1] | | | | Content of inorganic filler (d1) | Average particle diameter |
| | Type | (µm) | D2.6E | UDMA | Bis-GMA | 3G | Type | (mass %) | (µm) |
| Production Example 1 | E-1 | 0.02 | 60 | 20 | | 20 | D-2 | 50 | 15 |
| Production Example 2 | E-2 | 0.18 | | | 50 | 50 | D-1A | 75 | 5 |
| Production Example 3 | E-3 | 0.4 | | | 50 | 50 | D-1B | 80 | 5 |

[1]Content of each monomer in total amount of polymerizable monomers (mass %)

Prepolymer (F-1)

A three-neck flask was charged with 13 g of D2.6E and 7 g of IBX-MA (polymerizable monomers), 11 g of 2,4-diphenyl-4-methyl-1-pentene (chain transfer agent), and 90 g of toluene (solvent). These were dissolved, and subjected to 30 minutes of nitrogen bubbling. After adding 0.7 g of benzoyl peroxide (polymerization initiator), the mixture was stirred to obtain a toluene solution.

The toluene solution was heat stirred at 80° C. heat in an oil bath under reflux. Heating was stopped after 240 minutes, and the solution was dropped into 500 g of hexane to obtain a precipitate at the bottom. The precipitate was dried overnight at ordinary temperature under reduced pressure to obtain a white powder of prepolymer (F-1). The prepolymer had a weight-average molecular weight of 46,000, and seventeen polymerizable functional groups per molecule.

bottom, light was applied through the glass slides from both sides to cure the composition. Here, light was applied at 5 points each side, 10 seconds at each point, using a dental LED photoirradiator for polymerization (PenCure 2000 manufactured by J. Morita Corp. under this trade name). A total of five cured product specimens were prepared for each Example and Comparative Example. After being taken out of the die, the specimens were measured for three-point flexural strength and flexural modulus at a span length of 20 mm and a crosshead speed of 1 mm/min, using a universal testing machine (trade name AG-I 100 kN, Shimadzu Corporation). From the measured values, mean values were calculated for each specimen to find the flexural strength and flexural modulus (n=5).

Polymerization Shrinkage Stress

The dental restoration material compositions prepared in the Examples and Comparative Examples below were separately filled into a ring-shaped die (stainless steel, 5.5 mm in inner diameter×0.8 mm in thickness) installed on a 4.0 mm-thick glass plate. The glass plate was used after being sandblasted with an alumina powder having a particle diameter of 50 µm. Thereafter, a stainless-steel jig (Ø=5 mm) coupled to a universal testing machine (trade name Micro-Autograph MST-I, manufactured by Shimadzu Corporation) was set on the dental restoration material composition filling the die on the glass plate. The dental restoration material composition was then cured by applying light to the dental restoration material composition for 20 seconds through the glass plate, using a dental LED photoirradiator for polymerization (PenCure 2000 manufactured by J. Morita Corp. under this trade name). Here, a polymerization shrinkage stress due to curing by polymerization reaction of the dental restoration material composition in response to photoirradiation was measured with the universal testing machine (n=5). The measured mean values are presented in Tables 2 and 3. Smaller mean values are preferred because smaller values of polymerization shrinkage stress mean less occurrence of a contraction gap. Smaller values of polymerization shrinkage stress are also preferred from a procedure standpoint because a greater amount of dental restoration material composition can be filled at once when the polymerization shrinkage stress is small. The preferred value of polymerization shrinkage stress is 11.0 MPa or less, more preferably 10.0 MPa or less, even more preferably 9.0 MPa or less.

Glossiness

The dental restoration material compositions prepared in the Examples and Comparative Examples below were separately filled into a cylindrical mold measuring 10 mm in diameter and 5 mm in height, and were cured by being allowed to thoroughly undergo photopolymerization. The cured product was taken out of the mold, and immersed in 37° C. water for 24 hours to prepare a specimen for polishability test. After polishing one surface of the specimen with a waterproof abrasive paper #1500, the surface was finished by being polishing for 1 minute with a dental polishing disc (Sof-Lex® Superfine, manufactured by 3M). Surface glossiness was then measured over a measurement area of 6 mm diameter at 60° angle, using a gloss meter (VG 2000 manufactured by Nippon Denshoku Industries Co., Ltd.; JIS Z 8741:1997 compliant) calibrated with a standard plate having a gloss level of 93.5% at 60° measurement angle (n=2). The measured value was determined as an index of polishability. The measured mean values are presented in Tables 2 and 3. As a measure of polishability, the preferred glossiness is 65% or more, more preferably 70% or more.

Average Primary Particle Diameter of Filler

The average primary particle diameters of organic-inorganic composite filler (D) and inorganic filler (E) were measured as follows. For fillers with an average primary particle diameter of 0.10 µm or more, the average primary particle diameter was measured by volume using a laser diffraction particle size distribution analyzer (SALD-7500 Nano, manufactured by Shimadzu Corporation). A 0.2% sodium hexametaphosphate aqueous solution was used as dispersion medium. For fillers with an average primary particle diameter of less than 0.10 µm (inorganic ultrafine particles), the average primary particle diameter was determined by measuring the particle diameters of particles (at least 200 particles) observed in a unit field of a captured image taken with a transmission electron microscope (Model H-800NA, manufactured by Hitachi, Ltd.), using image-analyzing particle-size-distribution measurement software (Mac-View, Mountech Co., Ltd.) (n=1). Here, the particle diameter is determined as an arithmetic mean value of the maximum and minimum lengths of particles, and the average primary particle diameter is calculated from the number of particles and the particle diameter.

Light Diffusivity

The dental restoration material compositions prepared in the Examples and Comparative Examples below were separately filled into a cylindrical mold measuring 30 mm in diameter and 0.25±0.01 mm in thickness, and were cured into a specimen by being allowed to thoroughly undergo photopolymerization. The specimen was measured for the luminous intensity distribution of transmitted light with a goniophotometer (GP-200, Murakami Color Research Laboratory Co., Ltd.) (n=1). The light diffusivity was calculated according to the following formula.

$$\text{Light diffusivity} = \{(I_{20}/\cos 20°) + (I_{70}/\cos 70°)\}/(2 \times I_0),$$

where I represents the luminous intensity of transmitted light through the specimen, and $I_0$, $I_{20}$, and $I_{70}$ represent light intensities at 0°, 20°, 70° angles, respectively, with respect to the direction of incident light. The trigonometric function represents a cosine of the direction the luminous intensity was measured. The unit of angle is degrees (°).

Weight-Average Molecular Weight of Prepolymer

The weight-average molecular weight of prepolymer was determined by GPC measurement. Specifically, tetrahydrofuran was used as eluent, and a column was prepared by joining two TSKgel SuperMultipore HZM-M columns (manufactured by Tosoh Corporation) and one TSKgel SuperHZ 4000 column (manufactured by Tosoh Corporation), end to end. A GPC system HLC-8320 GPC (manufactured by Tosoh Corporation) equipped with a differential refractive index detector (RI detector) was used as GPC device. For measurement, 4 mg of a prepolymer was dissolved in 5 mL of tetrahydrofuran to prepare a sample solution. With the column oven temperature set to 40° C., 20 µL of the sample solution was injected at an eluent flow rate of 0.35 mL/min, and the resulting chromatogram of the prepolymer was analyzed. Separately, a standard curve relating retention time and molecular weight was created by GPC using ten polystyrene standards having a molecular weight in the 400 to 5,000,000 range. The weight-average molecular weight of the prepolymer was then determined from its chromatogram, using the standard curve (n=1).

Number of Unreacted Polymerizable Functional Groups in Prepolymer (Average per Molecule)

The concentration ρ (mol/g) of unreacted polymerizable functional groups in a prepolymer was determined by $^1$H-NMR measurement, and the measured concentration was multiplied by the weight-average molecular weight ($M_w$) determined by the method described above (ρ×$M_w$). The calculated value was determined as the number of unreacted polymerizable functional groups in the prepolymer (average per molecule).

In the $^1$H-NMR measurement, about 30 mg of a prepolymer, and about 2 mg of dimethyl terephthalate (internal standard; a molecular weight of 194.19) were weighed (the weighed value of prepolymer is $W_P$ (mg), and the weighed value of dimethyl terephthalate is $W_D$ (mg)), and dissolved in 3 mL of deuterated chloroform. The solution was measured at room temperature with 16 scans using a NMR spectrometer (ULTRA SHIELD 400 PLUS, manufactured by Bruker), and the mole ratio ($R_{P/D}$) of methacryloyl group and dimethyl terephthalate was determined from the integral value of proton peaks (5.55 ppm and 6.12 ppm) attributed to the methacryloyl group, and the integral value of an aromatic proton peak (8.10 ppm) of dimethyl terephthalate, using the following formula.

$$R_{P/D}=[(I_{5.55}+I_{6.12})/2]/(I_{8.10}/4),$$

where $I_{5.55}$ represents the integral value of the peak at 5.55 ppm, $I_{6.12}$ represents the integral value of the peak at 6.12 ppm, and $I_{8.10}$ represents the integral value of the peak at 8.10 ppm.

The mole ratio ($R_{P/D}$) of methacryloyl group and dimethyl terephthalate was used to determine the concentration ρ [mol/g] of the polymerizable functional groups in the prepolymer (n=1), using the following formula.

$$\rho=[R_{P/D}\times W_D/194.19]/W_P,$$

where $W_D$ represents the weighed value (mg) of dimethyl terephthalate, and $W_P$ represents the weighed value (mg) of prepolymer.

Example 1

The polymerization initiators and polymerization accelerator were completely dissolved in the polymerizable monomers in the mass ratio shown in Table 2, and D-1A (organic-inorganic composite filler (D); an average particle diameter of 5 μm) and E-2 (inorganic filler (E); an average primary particle diameter of 0.18 μm) were added to the solution in the mass ratio shown in Table 2. The mixture was kneaded into a homogenous paste, using an agate mortar. The paste was placed under a reduced pressure to remove fine bubbles, and was evaluated for various physical properties, using the foregoing methods.

Examples 2 to 15, and Comparative Examples 1 to 5

Dental restoration material compositions of Examples 2 to 15 and Comparative Examples 1 to 5 were prepared in the same manner as in Example 1, according to the compositions (parts by mass) shown in Tables 2 and 3, and the physical properties were evaluated as in Example 1. The results are presented in Tables 2 and 3.

TABLE 2

| Components (parts by mass) | | | | Example 1 | Example 2 | Example 3 | Example 4 | Example 5 | Example 6 |
|---|---|---|---|---|---|---|---|---|---|
| Polymerizable monomer-containing composition | (Meth)acrylic acid ester compound (A) | D2.6E | | 40 | | 20 | 20 | 20 | 35 |
| | | UDMA | | 50 | 50 | 50 | 50 | 50 | |
| | | 3G | | | | | | | 35 |
| | | 9G | | | | | | | |
| | Mono(meth)acrylic acid ester compound (B) | POB-A | | 10 | 50 | 30 | 30 | 30 | |
| | | POB-MA | | | | | | | 30 |
| | Mono(meth)acrylic acid ester compound | IBX-MA | | | | | | | |
| | | D-MA | | | | | | | |
| | Polymerization initiator (C) | CQ | | 0.5 | 0.5 | 0.5 | 0.5 | 0.5 | 0.5 |
| | | TMDPO | | 0.4 | 0.4 | 0.4 | 0.4 | 0.4 | 0.4 |
| | Polymerization accelerator | JJA | | 0.5 | 0.5 | 0.5 | 0.5 | 0.5 | 0.5 |
| Viscosity of whole polymerizable monomer mixture (cP) | | | | 1727 | 190 | | 524 | | 36 |
| Polymerizable monomer-containing composition | | | | 22 | 22 | 22 | 22 | 22 | 25 |
| Inorganic filler (E) | Ar130 (E-1) | Refractive index: 1.450 | | | | | | | 5 |
| | NF180 (E-2) | Refractive index: 1.523 | | 20 | 20 | 20 | 20 | 48 | |
| | UF0.4 (E-3) | Refractive index: 1.523 | | | | | | | |
| | UF1.2 (E-4) | Refractive index: 1.523 | | | | | | | |
| Organic-inorganic composite filler (D) | D-1A | Refractive index: 1.523 | | 58 | 58 | 58 | | | 70 |
| | D-1B | Refractive index: 1.523 | | | | | | 30 | |
| | D-2 | Refractive index: 1.480 | | | | | 58 | | |
| | Refractive index difference of D-1 and D-2 (absolute value) | | | | | | | | |
| Prepolymer (F-1) | | | | | | | | | |
| Total | | | | 100 | 100 | 100 | 100 | 100 | 100 |
| Flexural strength (MPa) | | 110 MPa or more | | 118 | 117 | 126 | 118 | 135 | 112 |
| Polymerization shrinkage stress (MPa) | | Less than 11 MPa | | 9.7 | 9.6 | 9.8 | 9.8 | 9.5 | 9.0 |
| Glossiness (%) | | 65% or more | | 80 | 80 | 80 | 80 | 75 | 80 |
| Light diffusivity | | 0.001 or more | | | | | | | |

| Components (parts by mass) | | | | Example 7 | Example 8 | Example 9 | Example 10 | Example 11 | Example 12 |
|---|---|---|---|---|---|---|---|---|---|
| Polymerizable monomer-containing composition | (Meth)acrylic acid ester compound (A) | D2.6E | | 35 | 35 | 35 | 35 | 35 | 35 |
| | | UDMA | | | | | | | |
| | | 3G | | 35 | 35 | 35 | 35 | 35 | 35 |
| | | 9G | | | | | | | |
| | Mono(meth)acrylic acid ester compound (B) | POB-A | | | | | | | |
| | | POB-MA | | 30 | 30 | 30 | 30 | 30 | 30 |
| | Mono(meth)acrylic acid ester compound | IBX-MA | | | | | | | |
| | | D-MA | | | | | | | |
| | Polymerization initiator (C) | CQ | | 0.5 | 0.5 | 0.5 | 0.5 | 0.5 | 0.5 |
| | | TMDPO | | 0.4 | 0.4 | 0.4 | 0.4 | 0.4 | 0.4 |

TABLE 2-continued

|  |  |  |  |  |  |  |  |  |
|---|---|---|---|---|---|---|---|---|
|  | Polymerization accelerator | JJA |  | 0.5 | 0.5 | 0.5 | 0.5 | 0.5 | 0.5 |
| Viscosity of whole polymerizable monomer mixture (cP) |  |  |  |  |  | 36 |  |  |  |
| Polymerizable monomer-containing composition |  |  | 22 | 22 | 24 | 22 | 40 | 22 |
| Inorganic filler (E) | Ar130 (E-1) | Refractive index: 1.450 |  | 5 | 3 |  |  |  |
|  | NF180 (E-2) | Refractive index: 1.523 | 48 |  |  | 20 |  | 16 |
|  | UF0.4 (E-3) | Refractive index: 1.523 |  | 43 |  |  |  |  |
|  | UF1.2 (E-4) | Refractive index: 1.523 |  |  | 23 |  |  |  |
| Organic-inorganic composite filler (D) | D-1A | Refractive index: 1.523 | 30 |  | 50 | 58 | 60 | 50 |
|  | D-1B | Refractive index: 1.523 |  | 30 |  |  |  |  |
|  | D-2 | Refractive index: 1.480 |  |  |  |  |  | 7 |
|  | Refractive index difference of D-1 and D-2 (absolute value) |  |  |  |  |  |  | 0.043 |
| Prepolymer (F-1) |  |  |  |  |  |  |  | 5 |
| Total |  |  | 100 | 100 | 100 | 100 | 100 | 100 |
| Flexural strength (MPa) |  | 110 MPa or more | 138 | 135 | 115 | 115 | 111 | 115 |
| Polymerization shrinkage stress (MPa) |  | Less than 11 MPa | 9.8 | 9.2 | 9.3 | 9.5 | 9.0 | 8.4 |
| Glossiness (%) |  | 65% or more | 80 | 70 | 65 | 80 | 80 | 80 |
| Light diffusivity |  | 0.001 or more |  |  |  |  |  | 0.032 |

TABLE 3

|  |  |  | Example | | | Comparative Example | | | | |
|---|---|---|---|---|---|---|---|---|---|---|
| Components (parts by mass) |  |  | 13 | 14 | 15 | 1 | 2 | 3 | 4 | 5 |
| Polymerizable monomer-containing composition | (Meth)acrylic acid ester compound (A) | D2.6E | 35 | 20 | 20 | 20 | 20 | 20 | 20 | 20 |
|  |  | UDMA |  | 50 | 50 | 50 | 50 | 50 | 50 | 50 |
|  |  | 3G |  |  |  | 30 | 30 |  |  |  |
|  |  | 9G | 35 |  |  |  |  |  |  |  |
|  | Mono(meth)acrylic acid ester compound (B) | POB-A |  |  |  |  |  |  |  | 30 |
|  |  | POB-MA | 30 | 30 | 30 |  |  |  |  |  |
|  | Mono(meth)acrylic acid ester compound | IBX-MA |  |  |  |  |  | 30 |  |  |
|  |  | D-MA |  |  |  |  |  |  | 30 |  |
|  | Polymerization initiator (C) | CQ | 0.5 | 0.5 | 0.5 | 0.5 | 0.5 | 0.5 | 0.5 | 0.5 |
|  |  | TMDPO | 0.4 | 0.4 | 0.4 | 0.4 | 0.4 | 0.4 | 0.4 | 0.4 |
|  | Polymerization accelerator | JJA | 0.5 | 0.5 | 0.5 | 0.5 | 0.5 | 0.5 | 0.5 | 0.5 |
| Viscosity of whole polymerizable monomer mixture (cP) |  |  | 74 | 521 |  | 425 |  | 370 | 117 | 524 |
| Polymerizable monomer-containing composition |  |  | 22 | 22 | 22 | 22 | 40 | 22 | 22 | 22 |
| Inorganic filler (E) | Ar130 (E-1) | Refractive index: 1.450 |  |  |  |  |  |  |  |  |
|  | NF180 (E-2) | Refractive index: 1.523 | 16 | 16 | 20 | 20 |  | 20 | 20 | 78 |
|  | UF0.4 (E-3) | Refractive index: 1.523 |  |  |  |  |  |  |  |  |
|  | UF1.2 (E-4) | Refractive index: 1.523 |  |  |  |  |  |  |  |  |
| Organic-inorganic composite filler (D) | D-1A | Refractive index: 1.523 | 50 | 50 | 58 | 58 | 60 | 58 | 58 |  |
|  | D-1B | Refractive index: 1.523 |  |  |  |  |  |  |  |  |
|  | D-2 | Refractive index: 1.480 | 7 | 7 |  |  |  |  |  |  |
|  | Refractive index difference of D-1 and D-2 (absolute value) |  | 0.043 | 0.043 |  |  |  |  |  |  |
| Prepolymer (F-1) |  |  | 5 | 5 |  |  |  |  |  |  |
| Total |  |  | 100 | 100 | 100 | 100 | 100 | 100 | 100 | 100 |
| Flexural strength (MPa) |  | 110 MPa or more | 119 | 117 | 120 | 95 | 80 | 102 | 96 | 145 |
| Polymerization shrinkage stress (MPa) |  | Less than 11 MPa | 8.3 | 8.6 | 9.4 | 12.5 | 9.5 | 9.8 | 11.5 | 13.8 |
| Glossiness (%) |  | 65% or more | 80 | 80 | 80 | 80 | 80 | 80 | 80 | 80 |
| Light diffusivity |  | 0.001 or more | 0.032 | 0.032 |  |  |  |  |  |  |

As shown in Tables 2 and 3, the dental restoration material compositions of the present invention containing the (meth)acrylic acid ester compound (A) having two or more (meth)acryloyloxy groups per molecule, the specific mono(meth)acrylic acid ester compound (B), the polymerization initiator (C), and the organic-inorganic composite filler (D) were shown to have a low polymerization shrinkage stress, and the mechanical strength and polishability of the cured products were found to be excellent.

INDUSTRIAL APPLICABILITY

A dental restoration material composition of the present invention is low in polymerization shrinkage stress, and its cured product has high mechanical strength and excellent polishability. This makes a dental restoration material composition of the present invention suited for use in applications such as dental composite resins. Because of the low polymerization shrinkage stress, a dental restoration material composition of the present invention can be more suitably used particularly as a bulk fill composite resin.

The invention claimed is:

1. A dental restoration material composition comprising:
a (meth)acrylic acid ester compound (A) having two or more (meth)acryloyloxy groups per molecule;
a mono(meth)acrylic acid ester compound (B);
a polymerization initiator (C); and
an organic-inorganic composite filler (D),
wherein the organic-inorganic composite filler (D) is an organic-inorganic composite filler that has an average particle diameter of 3 μm to 25 μm, and in which an inorganic filler having an average primary particle diameter of 0.5 μm or less is dispersed in an organic matrix,
wherein the organic-inorganic composite filler (D) is present in an amount of 30 to 75 mass % of a total amount of the dental restoration material composition, and
wherein the mono(meth)acrylic acid ester compound (B) comprises at least one selected from the group consisting of a mono(meth)acrylic acid ester compound (B-1) represented by formula (I), and a mono(meth)acrylic acid ester compound (B-2) represented by formula (II),

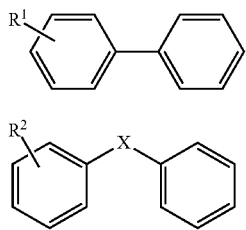

(I)

(II)

wherein R¹ and R² are each independently a group represented by formula (i) or a group represented by formula (ii), and X is an oxygen atom,

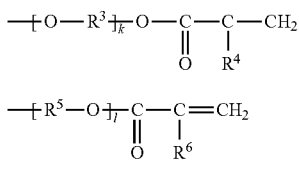

(i)

(ii)

wherein R³ and R⁵ are each independently a divalent hydrocarbon group having 1 to 10 carbon atoms, R⁴ and R⁶ are each independently a hydrogen atom or a methyl group, and k and l are each independently an integer of 0 to 6.

2. The dental restoration material composition according to claim 1, wherein the organic matrix comprises a polymer of a polymerizable monomer (d2), and the polymerizable monomer (d2) comprises the (meth)acrylic acid ester compound (A) having two or more (meth)acryloyloxy groups per molecule.

3. The dental restoration material composition according to claim 1, wherein the organic-inorganic composite filler (D) comprises an organic-inorganic composite filler (D-1) having a refractive index (nD) of 1.50<nD≤1.70, and an organic-inorganic composite filler (D-2) having a refractive index of 1.45≤nD≤1.50.

4. The dental restoration material composition according to claim 1, wherein the mono(meth)acrylic acid ester compound (B) comprises a mono(meth)acrylic acid ester compound (B-2) represented by formula (II).

5. The dental restoration material composition according to claim 1, wherein k and l are each 0 or 1.

6. The dental restoration material composition according to claim 1, which further comprises an inorganic filler (E).

7. The dental restoration material composition according to claim 1, which further comprises a polymer (F).

8. The dental restoration material composition according to claim 7, wherein the polymer (F) is a prepolymer (F-1) having an unreacted polymerizable functional group.

9. The dental restoration material composition according to claim 8, wherein the prepolymer (F-1) has a weight-average molecular weight of 1,000 to 1,000,000.

10. The dental restoration material composition according to claim 1, wherein a whole polymerizable monomer mixture has a viscosity at 23° C. of 2,000 cP or less.

11. The dental restoration material composition according to claim 1, wherein the (meth)acrylic acid ester compound (A) having two or more (meth)acryloyloxy groups per molecule comprises a compound (A-1) having an aromatic ring.

12. The dental restoration material composition according to claim 1, wherein the (meth)acrylic acid ester compound (A) having two or more (meth)acryloyloxy groups per molecule is a compound having no hydroxyl group.

13. A dental restoration material composition comprising:
a (meth)acrylic acid ester compound (A) having two or more (meth)acryloyloxy groups per molecule;
a mono(meth)acrylic acid ester compound (B);
a polymerization initiator (C);
an organic-inorganic composite filler (D); and
an inorganic filler (E),
wherein the organic-inorganic composite filler (D) is an organic-inorganic composite filler that has an average particle diameter of 5 μm to 15 μm, and in which an inorganic filler having an average primary particle diameter of 0.02 to 0.04 μm is dispersed in an organic matrix,
wherein the (meth)acrylic acid ester compound (A) is present in an amount of 50 to 90 mass % of a total amount of polymerizable monomers in the dental restoration material composition,
wherein the mono(meth)acrylic acid ester compound (B) is present in an amount of 10 to 50 mass % of a total amount of polymerizable monomers in the dental restoration material composition,
wherein the organic-inorganic composite filler (D) is present in an amount of 30 to 70 mass % of a total amount of the dental restoration material composition,
wherein the inorganic filler (E) is present in an amount of 5 to 48 mass % of a total amount of the dental restoration material composition, and
wherein the mono(meth)acrylic acid ester compound (B) comprises a mono(meth)acrylic acid ester compound (B-2) represented by formula (II),

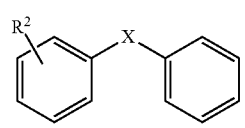

(II)

wherein $R^2$ is a group represented by formula (i) or a group represented by formula (ii), and X is an oxygen atom,
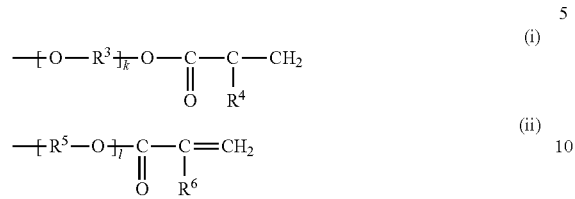
wherein $R^3$ and $R^5$ are each independently a divalent hydrocarbon group having 1 to 10 carbon atoms, $R^4$ and $R^6$ are each independently a hydrogen atom or a methyl group, and k and l are each independently an integer of 0 to 6.
* * * * *